United States Patent [19]
Hoogerwerf et al.

[11] Patent Number: 5,523,539
[45] Date of Patent: Jun. 4, 1996

[54] PROCESS FOR MANUFACTURING RECORDING HEADS FOR MAGNETIC STORAGE DEVICES

[75] Inventors: John Hoogerwerf; Robert Heinze, both of San Diego; John M. Rottenburg, Lakeside, all of Calif.

[73] Assignee: Conner Peripherals, Inc., San Jose, Calif.

[21] Appl. No.: 151,068

[22] Filed: Nov. 12, 1993

[51] Int. Cl.$^6$ .................................................. B23K 26/08
[52] U.S. Cl. ................. 219/121.68; 219/121.8; 219/121.85; 29/603.1; 29/603.18
[58] Field of Search .......... 219/121.67, 121.68, 219/121.69, 121.72, 121.78, 121.79, 121.8, 121.81, 121.82, 121.95; 29/603; 156/643, 644; 360/84, 85, 101, 107, 108, 119, 122; 216/22, 65, 94

[56] References Cited

U.S. PATENT DOCUMENTS

| | | | |
|---|---|---|---|
| 2,860,191 | 11/1958 | Runge et al. . | |
| 3,045,814 | 7/1962 | Hoshino | 360/107 |
| 3,621,153 | 11/1971 | Wenner | 29/603 |
| 4,017,965 | 4/1977 | Brutsch et al. | 29/603 |
| 4,186,480 | 2/1980 | Kriegelstein et al. | 29/603 |
| 4,301,353 | 11/1981 | Suenaga et al. . | |
| 4,328,410 | 5/1982 | Slivinsky et al. . | |
| 4,751,779 | 6/1988 | Nayatomo et al. | 29/603 |
| 5,095,447 | 3/1992 | Manns et al. . | |

FOREIGN PATENT DOCUMENTS

| | | |
|---|---|---|
| 0391539A3 | 10/1990 | European Pat. Off. . |
| WO93/26005 | 12/1993 | European Pat. Off. . |
| 59-047086 | 3/1984 | Japan . |
| 60-184484 | 9/1985 | Japan . |
| 63-304418 | 12/1988 | Japan . |
| 367533 | 4/1963 | Netherlands . |
| 654584 | 6/1951 | United Kingdom . |
| 1570010 | 6/1980 | United Kingdom . |
| WO8912525 | 12/1989 | WIPO . |

Primary Examiner—Teresa J. Walberg
Assistant Examiner—Gregory L. Mills
Attorney, Agent, or Firm—Fliesler, Dubb, Meyer & Lovejoy

[57] ABSTRACT

A method for improving the manufacture of an arcuate scan drive. Such drives include a plurality of read/write heads, each head having a gap and being mounted to a rotating drum. The method for manufacture includes: rotating the drum to determine the rotational center point of the drum; specifying a gap width for each gap; specifying a distance from the rotational center point to the head gap; and laser machining each of the head gaps to said gap width such that each head gap is positioned at said distance from the rotational center point of the head.

17 Claims, 17 Drawing Sheets

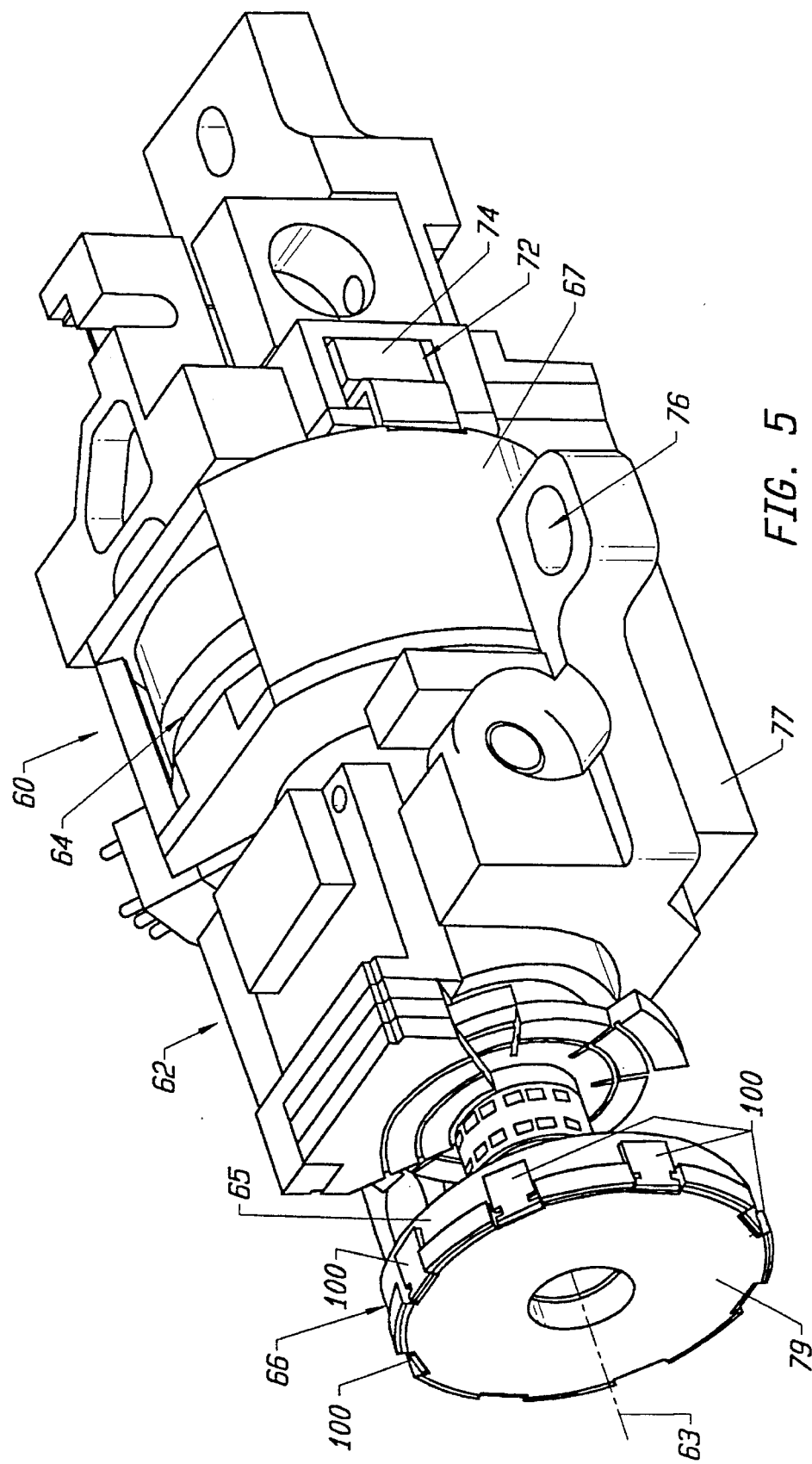

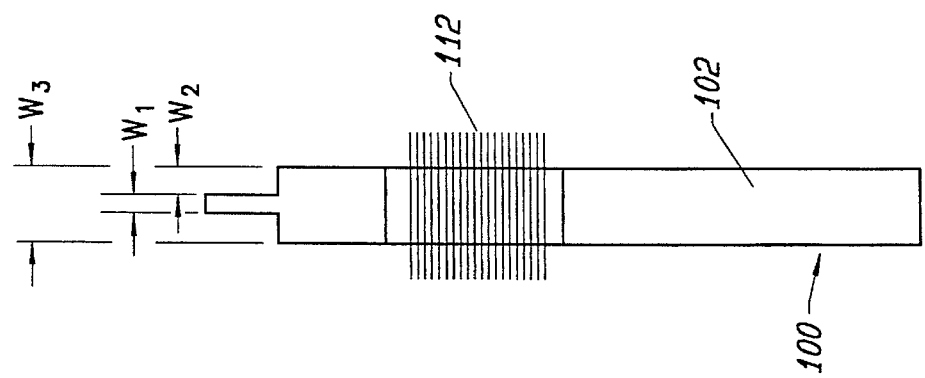
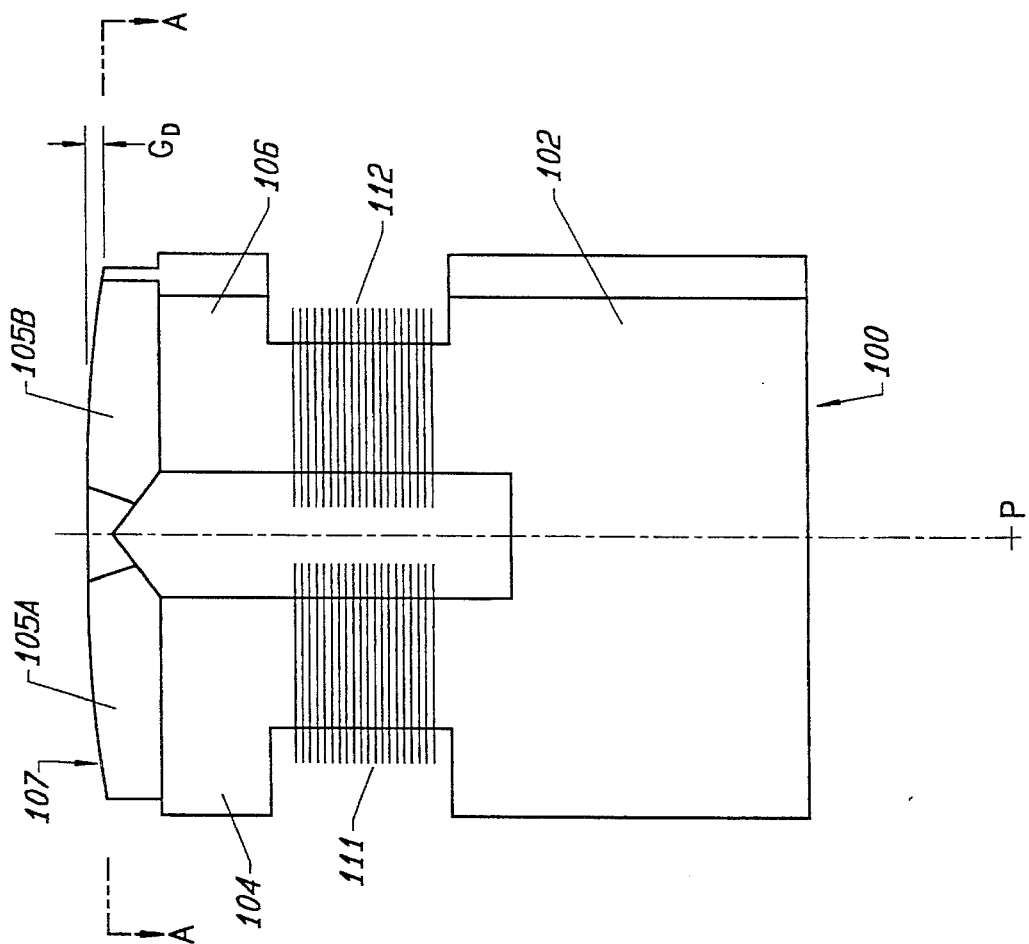

FIG. 16
PART 1

210 — Mount heads on drum and drum on read/write assembly

220 — Locate rotational axis of head drum

230 — Rotate drum and mark each mark_point (end_point_1) for heads $100_1$–$100_8$ 240 — Input variables: core_width, track_width, azimuth, trim_width, swp_angle, overlap, 1sr_power, vel, acl, passes 250 — For head $100_N$ calculate start_point_1, start_point_2, end_point_1, end_point_2, radius_1, radius_2, angle_1, angle_2

260 — For i=1, I≤passes, increment i=i+1

270 — Fillet—start_point_1, end_point_1 radius 1, angle 1, trim_width, swp_angle, overlap, vel, acl
Turn 1sr_power — off, move to start_point_1

──── Routine 300 ────

310 — Calculate overlap_distance, raduis, hyp, rows

320 — Calculate p1(x,y), p2(x,y), x_end, y_end using Eq. Set G

325 — Move to point p, (x,y)

To Fig. 16 Part 2

FIG. 16 PART 2

To Fig. 16 Part 1 →

← To Fig. 16 Part 1

330 – For rr=1, rr≤rows

340 – If first row (rr=1), then using eq. set H
calculate x,y_cntr_next, p2_next,
set move speed and arc at(−)swp_angle about x,y_cntr_next
move to p2_next 342 – If rr=even and not last row (e.g. rr−2,4...),
then using eq. set I,
calculate x,y_cntr_next, p1_next,
set move speed and arc from p2_next at (+)swp_angle
move to p1_next 344 – If rr=odd and not last row,
then using eq. set J,
calculate x,y_center_next, p1_next
set move speed and from p2_next arc at (−)swp_angle
move to p1_next 346 – If rr=even row and last row,
then using eq. set K,
calc x,y_cntr_next and arc @ (+) swp_angle 348 – If rr=odd row and last row,
then using eq. set L,
calc x,y_cntr_next and arc @ (+) swp_angle 350 – rr=rows 290 – Fillet−start_point_2, end_point_2
radius 2, angle 2, trim_width, swp_angle, overlap, vel, acl
Turn lsr_power_off, move to start_point_2
Run Routine 300

295 – i=passes

END

PROCESS FOR MANUFACTURING RECORDING HEADS FOR MAGNETIC STORAGE DEVICES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

CROSS-REFERENCE TO RELATED APPLICATIONS

ARCUATE SCAN TAPE DRIVE, U.S. Patent Application Ser. No. 08/113,996, filed Aug. 30, 1993, inventors John M. Rottenburg, Joseph Lin, Robert H. Pierce, Richard Milo, and Michael Andrews.

The above-cited application is assigned to the owner of the present invention and is hereby specifically incorporated by reference.

BACKGROUND OF THE INVENTION

1. Field of the Invention

The invention relates to a method for manufacturing recording heads for data storage devices, and specifically for defining the width of a recording head gap formed in a magnetic recording head.

2. Description of the Related Art

Most recording and reproducing transducers for magnetic storage devices are based on a design incorporating an inductive coil and magnetic core, thus being collectively referred to as "inductive heads." In this design, a magnetic core is surrounded by an inductive coil, which is coupled to electronic circuitry controlling the reading and writing of data to the magnetic storage medium. Magnetic flux is delivered to (or transferred from) the poles of the head core by a magnetic yoke that normally has a greater cross-sectional area than the poles in order to avoid saturation of the yoke region. Data is written on the storage medium in a plurality of data tracks, each having a width based on the medium used to store data. In magnetic storage devices, for example, the track width is limited by the intensity of the media and sensitivity of the recording heads. The general trend in data storage and retrieval technology has been one of decreasing data track width on the storage medium. Consequently, the head gap width, and head core volume are decreased as well, while recording densities and bandwidths have increased. Generally, a single head performs both the recording (write) and reproducing (read) functions, though the optimum writing head gap in a magnetic head is wider than the optimum reading head gap. (For purposes of definition, the gap "length" as used herein defines the distance between the poles, while gap "width" refers to the distance that the length between such poles is maintained.)

The gap in the pole pieces of a recording head is designed to produce a field amplitude capable of magnetically recording data on the storage medium to a sufficient depth, normally considered to be equal to or greater than the reading depth, corresponding to the recorded wavelength. The pole geometry and materials are designed to provide adequate field strength at the signal frequency, along with a rapid decrease of the writing field along the direction of the medium motion, in order to maximize the short-wavelength recording efficiency.

The limits to obtaining high track densities with narrow recording heads are determined by, among other things, the effects of the magnetic fields along the direction of medium motion. These fields can be thought of as fringing fields since they result along the ends of the recording gap as a result of the fringing effect of magnetic fields at the portion of the gap where the flux meets the edges of the core or the gap. As should be readily recognized, these fringe fields can partially erase tracks adjacent to a track being written at a given time, increase the effective read/write width of the head and can pick up the signals from adjacent tracks.

Inductive heads can be used as the basis for a number of recording applications such as video recorders, analog tape recorders, digital tape recorders, and data storage applications, such as tape drives.

Data storage tape drives are widely used in data processing systems as the primary data storage device or, more often, as a back-up data storage device to the system's hard disk drive. Conventional tape drives are designed to transfer data to and from a length of magnetically encoded tape, typically one-quarter inch in width, which is transferred between a supply reel and a take-up reel. While several tape drive designs exist for recording and playing back a data tape, the two most widely used drive technologies up to now have been stationary head tape drives for longitudinal recording and rotary head tape drives for transverse linear or "helical" recording.

In longitudinal recording, a tape drive includes a plurality of adjacent stationary heads which lie across the width of a data tape. In helical recording, one or more heads are provided around the circumferential surface of a rotating cylindrical drum. An advancing data tape encounters the rotating drum such that the longitudinal direction of the tape is angled with respect to the plane in which a recording head on the drum rotates. As such, rotary head helical recording provides a relatively large areal density.

Presently in the tape drive industry, as in other data storage technology areas, there is a movement toward smaller drive dimensions while at the same time increasing data storage capacity. Existing longitudinal and helical recording technologies have proven inadequate in meeting these demands.

Yet another type of recording scheme incorporates an "arcuate scan" of the tape. In arcuate scan drives, a rotating drum having a plurality of heads mounted thereon is positioned perpendicular to the tape and rotated such that each head makes an arcuate path over the tape as the tape passes around the head drum. Arcuate scan recording has been known for some time, but has been disfavored due to the lack of effective servoing schemes for accurately maintaining alignment of the heads with the arcuate data tracks.

U.S. patent application Ser. No. 07/898,926, filed Jun. 12, 1992, now abandoned by J. Lemke (hereafter "the Lemke application"), discloses a relatively compact arcuate scan tape drive for recording and playing back up to approximately 10 gigabytes on a conventional mini-cassette tape, a storage capacity which is higher than that previously obtained with either longitudinal or helical recording. FIGS. 1–3 of the present application are reproductions of FIGS. 1–3 of the Lemke application and constitute a perspective view of the arcuate scan drive, a top view of the head drum/tape interface, and a perspective view of the head drum, respectively. The Lemke application discloses a tape drive including a plurality of heads placed on the front circular face of a rotating drum, with the axis of rotation of the rotating drum being perpendicular to and intersecting with the longitudinal axis of the advancing tape. Head drum 30 rotates about axis 38 to pass heads 35 in arcuate paths along tape 21 as tape 21 passes head drum 30. As the tape advances from the right to the left and the drum rotates in a counterclockwise direction, the heads trace arcuately-shaped data tracks substantially transverse to the longitudinal axis of the tape.

The Lemke application discusses a drum having a plurality of heads which utilizes a sequential three head data transfer and positioning scheme. In the Lemke arrangement, the heads are arranged in triads where the first head is a read head, the second a write head and the third a servo head, each passing over a given track in succession. It should be readily understood that numerous head schemes are suitable for use with arcuate scan disk drives.

Another reason arcuate scan recording has traditionally been disfavored is that conventional head/tape engagement mechanisms employed in arcuate scan tape drives have proven inadequate in maintaining a close contact between the recording heads and the data tape, without simultaneously causing damage to the heads and/or tape in a relatively short period of time. A close head/tape interface is imperative to accurate alignment of the recording heads with the data tracks as well as to obtaining a high storage density on the data tape.

Another significant factor deterring the popularity of arcuate scan technology is the difficulty in manufacturing the recording heads and head drum in a cost effective and precise manner. With the arcuate scan drive disclosed in the Lemke application, for example, a data track width on the order of 0.0005 inch is utilized. The length and width of the recording gap of the read/write head is therefore crucial to accurate performance of the arcuate scan tape drive. The width of the gap is especially critical in defining the track widths which may be utilized in arcuate scan drives since, as discussed above, the width of the gap determines the intensity of fringing fields which may affect adjacent data tracks. Thus, manufacturing ferrite heads having two pole pieces and a recording gap with precisely defined length and width is extremely important in producing a commercially viable arcuate scan drive.

Further, aligning each of the heads on the head drum in a manner which ensures that each head is at the same distance with respect to the rotational axis of the drum is critical to ensuring proper read/write performance. Such alignment must tolerate inaccuracies in manufacturing a number of such heads with such minute gap sizes, imperfections in the heads, head drum, and read/write assembly, and yet be cost effective to maintain the commercial viability of the arcuate scan tape drive.

SUMMARY OF THE INVENTION

Thus, an object of the invention is to provide a method for manufacturing a magnetic recording head.

A further object of the invention is to provide a method of manufacturing magnetic recording heads which is automatable, thus making such manufacture cost effective.

A further object of the invention is to provide a novel method for defining the dimensions of a recording gap in an inductive magnetic recording head.

Yet another object of the invention is to provide a method of manufacturing inductive recording heads having a gap with a length and width, wherein the method allows the length of the gap to be accurately defined to precise dimensions in a plurality of recording heads.

Yet another object of the invention is to provide a method for manufacturing a plurality of recording heads pre-mounted on a head drum assembly suitable for use in an arcuate scan disk drive assembly.

A further object of the invention is to provide a method whereby each recording head gap is located precisely equivalent from a rotational axis point of the head drum to which the heads are mounted.

Yet another object of the invention is to provide an apparatus suitable for implementing the method in a manner which allows the heads to be pre-mounted to the recording head drum assembly.

These and other objects of the invention are provided in a method and apparatus for machining recording heads. The method and apparatus of the present invention provide a novel means for defining the width of recording heads suitable for use in a number of different applications. The invention incorporates the use of a precise laser machining process on each head, and further includes a method for machining a plurality of heads such that each head is an equal distance from a pre-selected point. This is useful in systems such as arcuate scan tape drives to ensure that the heads all cross the data storage medium at the same distance from the rotational axis. The apparatus of the present invention provides an automated means for performing the method of the present invention and for machining a plurality of recording heads in a cost effective manner.

In one aspect, the method includes alternately cutting the head core material with a laser to provide a recording gap, the gap having a length and a width, by moving the laser beam in a direction perpendicular to the length of the gap where the beam crosses the gap, and incrementing the beam in a direction parallel to the width to reduce the width of the gap. In a further aspect, the method comprises defining a width of the recording gap; making a first plurality of cuts on the first side of the gap to remove a first portion of the material required to define the width of the recording gap; and making a second plurality of cuts on the second side of the gap to remove a second portion of the material required to define the width of the recording gap, thereby leaving the gap at the defined width.

The invention includes a method for improving the manufacture of an arcuate scan drive. Such drives include a plurality of read/write heads, each head having a gap and being mounted to a rotating drum. The method for manufacture of the present invention includes: rotating the drum to determine the rotational center point of the drum; specifying a gap width for each gap; specifying a distance from the rotational center point to the head gap; and laser machining each of the head gaps to said gap width such that each head gap is positioned at said distance from the rotational center point of the head.

In a further aspect, the method of manufacturing an arcuate scan drive includes selecting the gap width of the head to match the data track width of the data tracks on the storage medium used in the arcuate scan drive.

In still another aspect of the invention, the step of laser machining the heads in an arcuate scan drive includes: marking a first point on the gap at the distance from the rotational axis; etching a first side of the head from the first side to the mark point; and etching a second side of the head from the second side to a position defined as the mark point plus the track width.

An apparatus of the present invention includes a laser; a mounting fixture allowing a read/write assembly of an arcuate scan drive to be supported in the apparatus; a granite housing supporting the laser; and a controller, the controller including instructions directing the laser to provide a plurality of arcuate cuts to a first side and a second side of the head to define the effective recording width of the head. In a further aspect the apparatus includes a computer vision system coupled to the controller to allow the controller to determine the center point of the head drum and the position of the heads.

Thus the method and apparatus of the present invention provide an accurate means to ensure that the gap width of each of the heads is precisely the same. In addition, the method reduces the amount of heating damage which could result from laser machining by moving the beam in a perpendicular relationship to the head gap when the beam intersects the gap, thereby yielding an extremely clean edge. Still further, the method ensures that all heads mounted to a drum of, for example, an arcuate scan tape assembly are equidistant from the rotational axis of the drum. In doing so, the method compensates for mechanical imperfections in the drum, and a read/write assembly to which the drum may be attached, and further compensates for temperature variations in the ambient environment where the method is performed.

BRIEF DESCRIPTION OF THE DRAWINGS

The invention will be described with respect to the particular embodiments thereof. Other objects, features, and advantages of the invention will become apparent with reference to the specification and drawings in which:

FIG. 5 is a view of a head drum assembly for use with the drive of FIG. 4.

FIG. 6B is a side view of the inductive read/write head shown in FIG. 6A.

FIG. 6C is an end view of the inductive read/write head shown in FIG. 6A.

FIG. 16 is a flowchart representing an exemplary process flow suitable for implementing the second embodiment of the method of the present invention.

DESCRIPTION OF THE PREFERRED EMBODIMENTS

Figure 1:
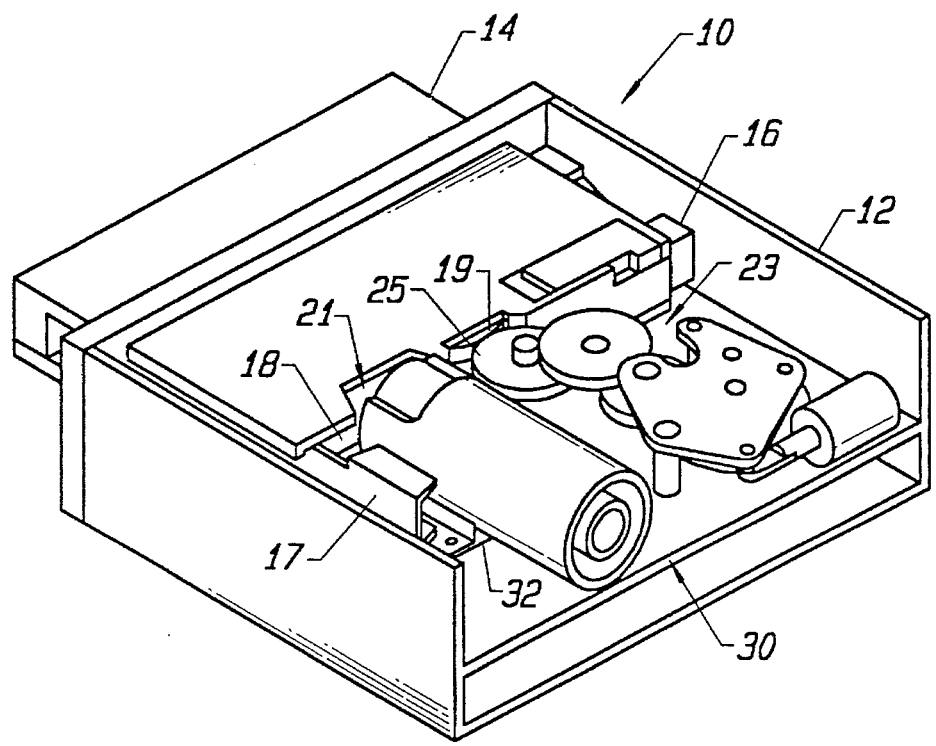
FIG. 1 is a perspective view of an arcuate scanning tape drive according to the disclosure of U.S. patent application Ser. No. 07/898,926.
Figure 2:
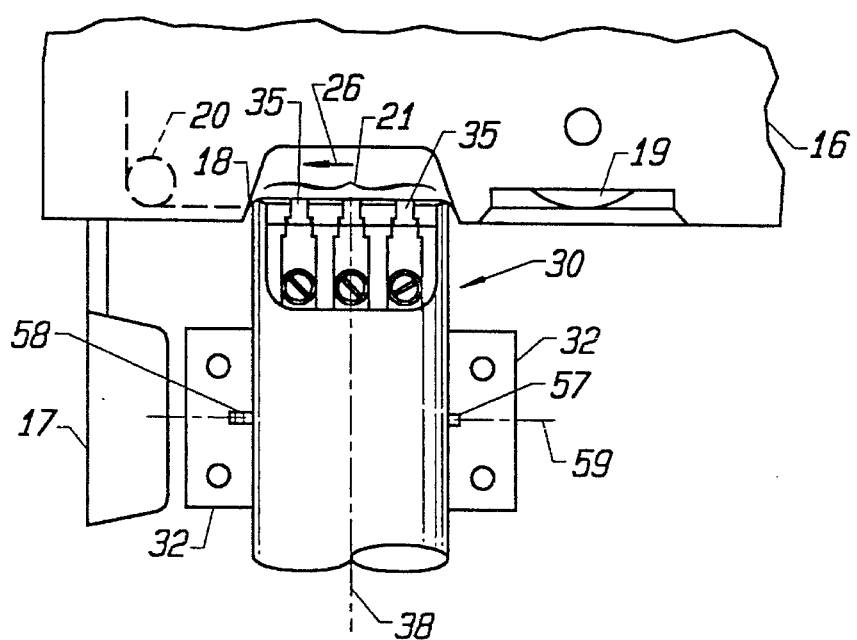
FIG. 2 is a top view of a rotary head assembly used in the drive according to FIG. 1.
Figure 3:
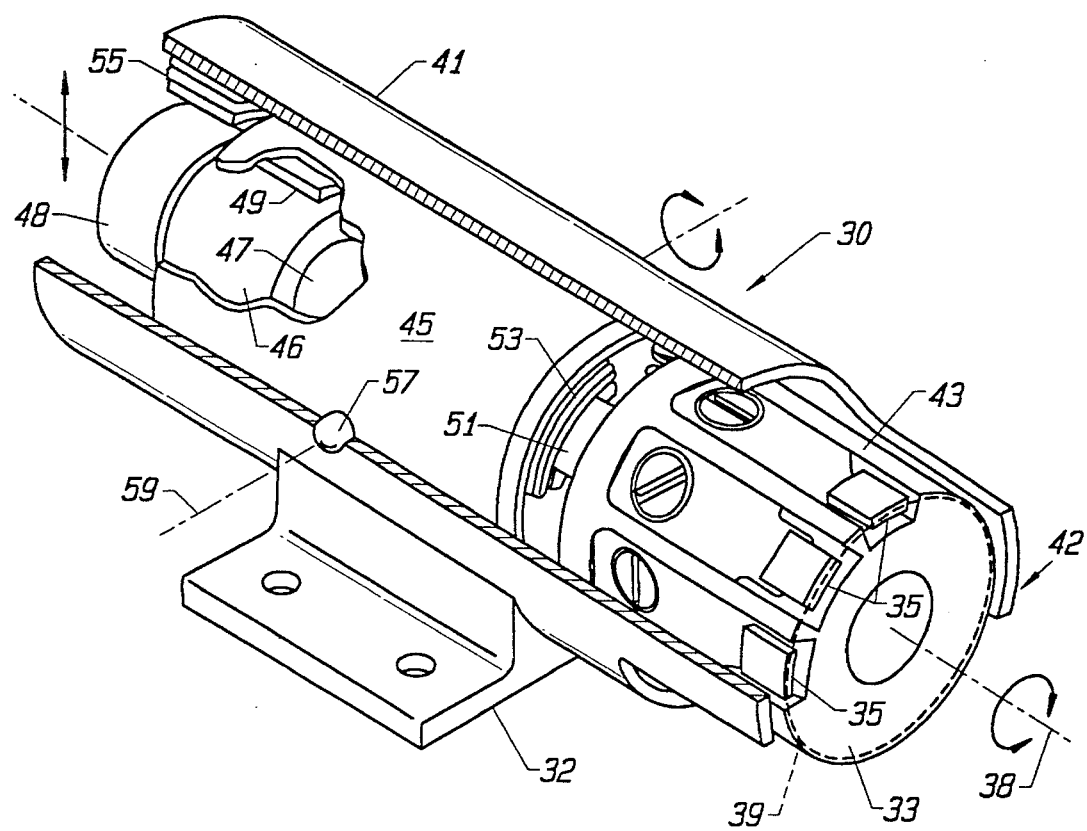
FIG. 3 is an enlarged, perspective, partial-cutaway view of the rotary head assembly shown in FIG. 2.
Figure 4:
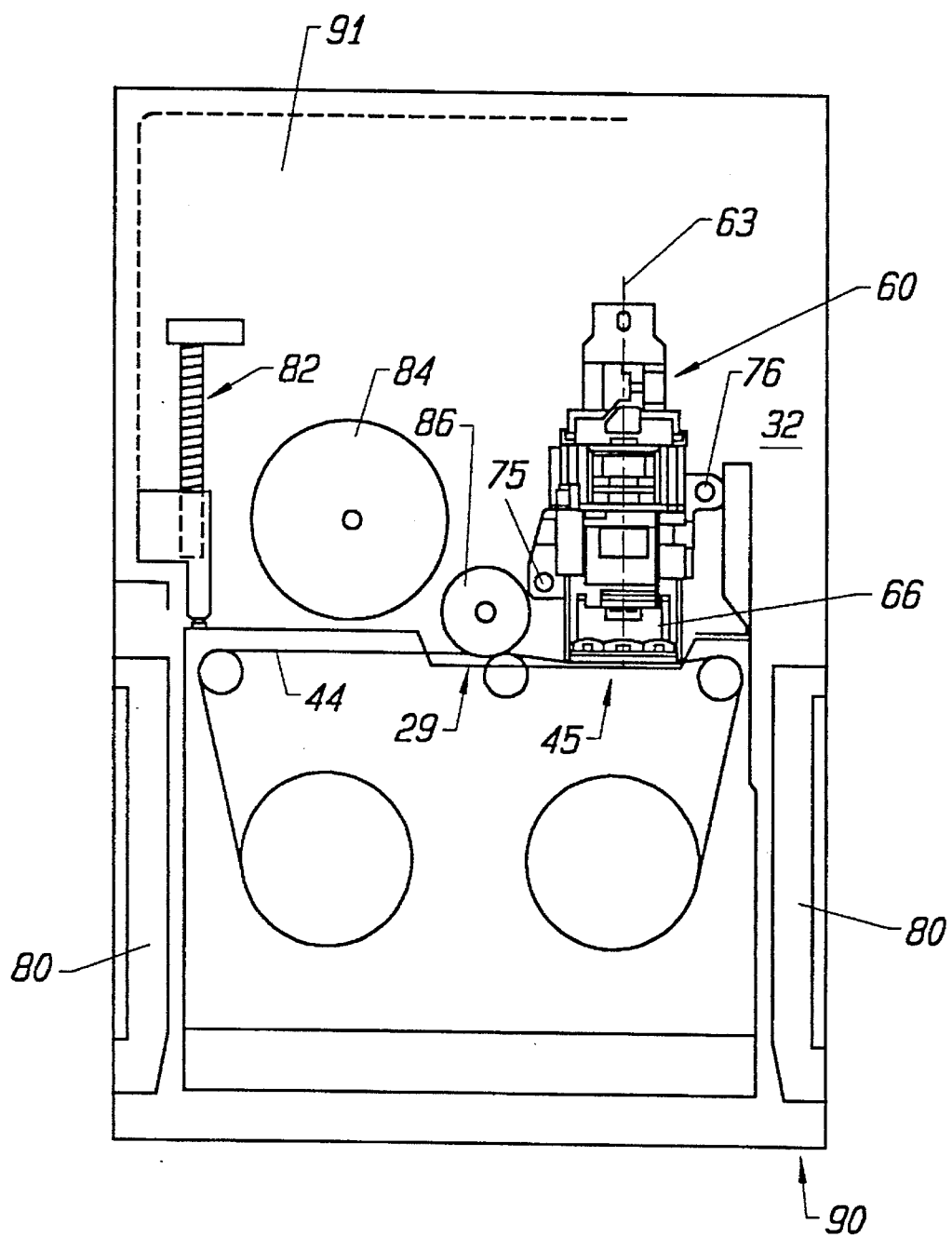
FIG. 4 is a top, plan view illustrating an arcuate scanning disk drive suitable for use in accordance with the present invention.

The present invention provides a system for accurately and automatically filleting the gap width of recording heads. Such heads may be optimally used in numerous applications and particularly in an arcuate scan tape drive head assemblies. FIG. 4 is a plan view of an exemplary arcuate scan disk drive in which such heads are suitable for use. In one embodiment, this drive utilizes eight heads, with alternating heads used for reading and writing data to and from the magnetic tape in an arcuate scan fashion.

In general, drive 90 includes a read/write assembly 60, a capstan motor assembly including a capstan roller 84, idler 86, and a motor (not shown), tape positioning mechanisms 80, and ejector 82. Details of drive 90 can be found in U.S. patent application ARCUATE SCAN TAPE DRIVE Application Ser. No. 08/113,996, filed Aug. 30, 1993, inventors John M. Rottenburg, Joseph Lin, Robert H. Pierce, Richard Milo, and Michael Andrews, owned by the assignee of the instant application and hereby incorporated by reference.

FIG. 5 is a perspective view of a read/write assembly which carries a plurality of recording heads around a head drum and allows for servoing of the head drum rotating adjacent to the surface of the tape to follow the relative position of the tape as the heads form arcuate tracks across the tape surface. Read/write assembly 60 will be described with reference to FIGS. 4 and 5. In general, read/write assembly 60 is comprised of a pivoting assembly 62 which is mounted on a base mount 77 attached to frame 91 of arcuate scan drive 90. Pivoting assembly 62 includes a rotating head drum assembly 66 for transferring data to and from the data tape 44, a spin motor 64 adjacent to the head drum assembly 66 for rotating the head assembly, a spin motor cap 67 substantially enclosing spin motor 64, and a voice coil motor coil 72 adjacent to spin motor cap 67. Voice coil motor coil 72, together with a magnet 74, causes the pivoting assembly to pivot in response to control signals from a printed circuit board which includes control electronics.

Figure 15:
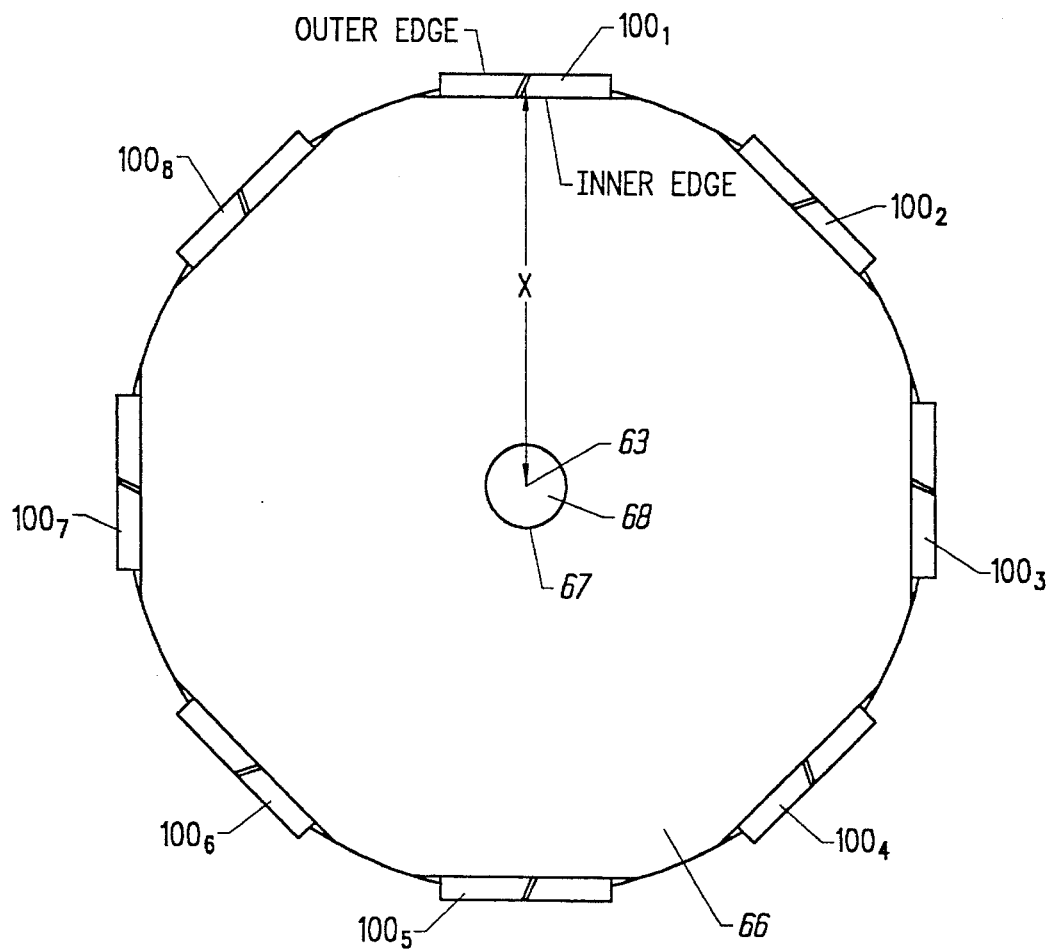
FIG. 15 is a plan view of a head drum such as that shown in the assembly of FIG. 5, including a plurality of heads such as that shown in FIGS. 6A–6D attached thereto.

A plurality of magnetically permeable core elements or "heads" 100 are provided around the outer radius of head drum assembly 66. Head drum 65 may be comprised of an octagonal body with a flat circular faceplate 79 at its front face. Heads 100 may be mounted on the flat edge surfaces of octagonal head drum 65, which may be affixed to or formed integrally with the faceplate 79. During operation of the drive 90, head drum assembly 66 rotates in, for example, a counterclockwise direction (viewed facing faceplate 79 as shown in FIG. 15) as tape 44 advances past faceplate 79 so that heads 100 trace out a plurality of arcuately shaped data tracks on the data tape 44. Head drum 65 is preferably formed of a heavy metal, which may be laser balanced to allow the head assembly 60 to rotate without vibration. In this embodiment, the rotational axis 63 of read/write assembly 60 lies perpendicular to the surface of data tape 44 and the entire front circular face 79 lies substantially parallel to the plane of data tape 44 in recording area 45.

It is extremely important that a particular head 100 be precisely aligned with a data track being read or written to the data tape. Consequently, it is critical that the head 100 and head gap 110 be located at a precisely controlled radius relative to rotational axis 63 of head assembly 60, thereby ensuring that each head 100 reads and writes at the same relative location on the tape and that the servoing mechanism of disk drive 90 may accurately position the heads to follow any vertical movement of the tape.

FIGS. 6A–6D are top, side, cross-sectional, and exploded views of a typical recording head 100 utilized with the arcuate scan tape drive discussed with respect to FIGS. 4 and 5. It should be understood that the recording head shown in FIGS. 6A–6D may be utilized with any number of different magnetic recording devices, including the arcuate scan drive disclosed in the Lemke application, and the method and apparatus of the present invention are not limited to use with the recording head disclosed in FIGS. 6A–6D.

Figure 6A:
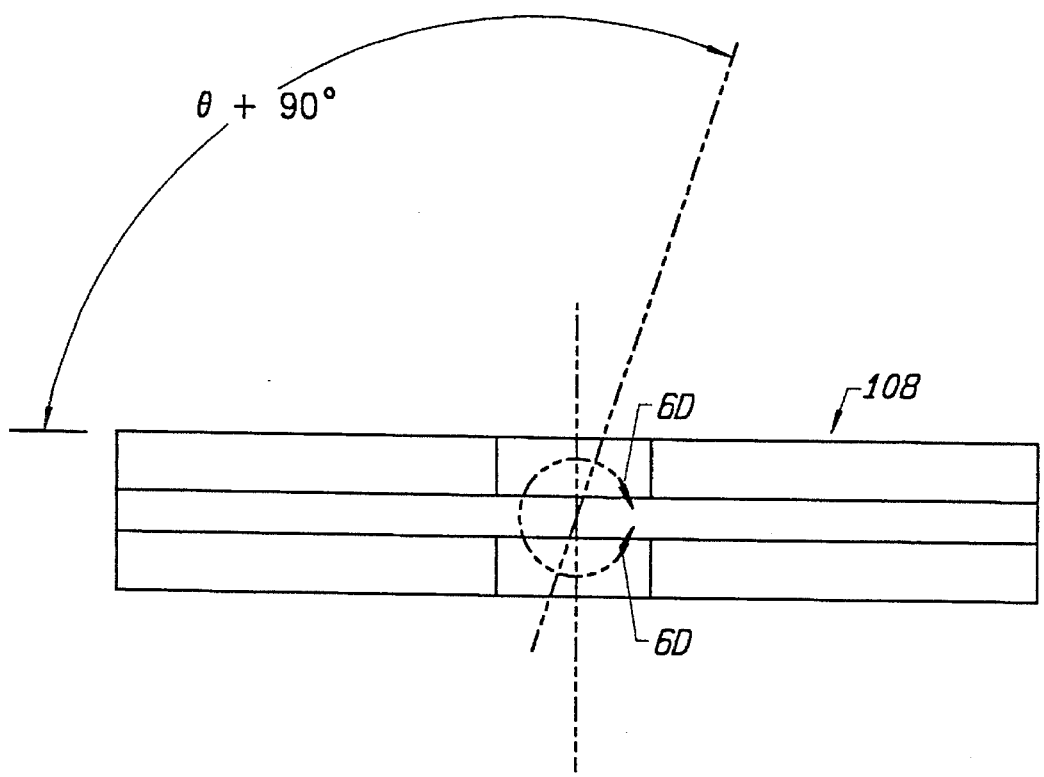
FIG. 6A is a top view of an individual inductive read/write head suitable for use with the head drum of FIG. 5.
Figure 6D:
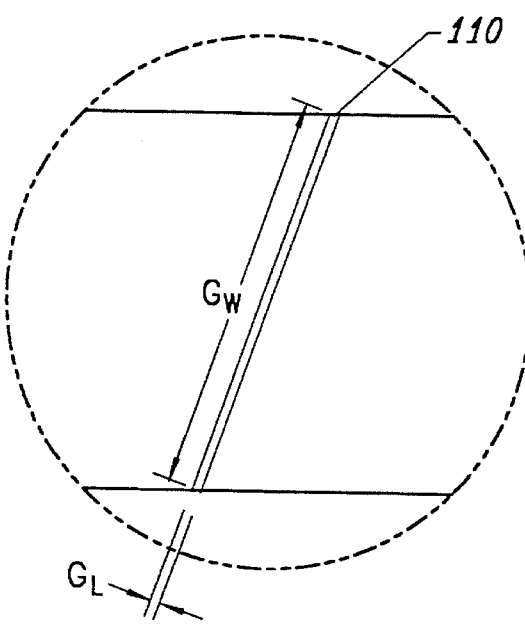
FIG. 6D is an enlarged view of the recording gap of the head shown in FIG. 6A.

Recording head 100 includes a block 102 of ferrite material formed into two poles 104, 106, each pole including a pole tip 105a, 105b, respectively. First and second coils 111 and 112 are provided on poles 104 and 106, respectively. As should be generally understood, inductive coils 111 and 112 are utilized during the reading function to couple the flux changes in the recording media to the drive electronics, and are utilized during the write function to induce a magnetic field in poles 106, 104. Pole tips 105a and 105b are separated by a gap 110. Gap 110 has a gap length $G_L$ and a width $G_W$, as shown in FIG. 6D, and a depth $G_d$, as shown in FIG. 6B. Gap 110 forms an angle $\phi+90°$ with respect to edge 108 of head 100. In one embodiment, angle $\phi$ is about 20°. Each pole tip 105a, 105b extends above the main body 102 of head 100. As shown in FIG. 6C, main body 102 has a width $W_3$ of approximately 0.011 inch. Each pole tip 105a, 105b has an initial width $W_1$ which, in one embodiment, is approximately 0.0032 inch. As shown in FIG. 6B, pole tips 105a and 105b have an arcuate upper edge 107 with the apex of the arc formed at gap 110. The arcuate upper edge is defined by a constant radius from point P, shown in FIG. 6B.

As noted above, the gap length $G_L$, width $G_W$ and depth $G_d$ can be optimized for the particular use of the head as a read head or write head. For a read head, gap length $G_L$ is optimized at 0.00014 inches. When optimized for a writing head, gap length $G_L$ is approximately 0.000035 inches. Similarly, gap depth $G_d$ also changes with respect to whether a read head or a write head is being manufactured. For example, a read head would have a preferable gap depth of 0.000787 inches while a write head would have a gap depth of 0.0010 inch.

In manufacturing head 100 for use in a recording device, the main body 102, poles 104, 106 and pole tips 105a, 105b may be fabricated from conventional means such as bonding and dicing. During this process, the gap length $G_L$ is normally defined during a fabrication process. Gap 110 is generally filled with bonding glass to prevent shorting of the gap.

The process of the present invention provides a means to adjust the gap width $G_W$ to exactly match the desired data track width, and thus allow control over the effects of side fringing magnetic fields associated with the gap. In the arcuate scan drive such as that shown in FIGS. 4 and 5, and/or the Lemke application, an arcuate data track is formed on the tape passing by the head as the head scans over the surface of the tape. With dimensions of the pole tips and the gap on the order of microinches, accurate and uniform gap lengths from head-to-head are critical to both reading and writing data on successive tracks on the tape. In a further aspect, the invention provides a means of assuring that the gap location on all heads of a particular head drum will be located at the same distance from the rotational axis of the drum.

FIGS. 7–11 illustrate a first embodiment of the process of the present invention. The process will be described with reference to FIGS. 7–11 and FIG. 12, which is an exploded representation of the pole tips 105a and 105b showing the angular measurements and conventions utilized in the method of the present invention to calculate laser filleting start positions, start points, end points and other variables.

In broad terms, the process comprises accurately positioning a laser beam having sufficient energy to etch the ferrite material at the pole tips, and performing a series of accurate cuts at each side of recording gap 110, thereby precisely defining the width $G_W$ of the gap. Although the invention is not so limited, it is advantageous to implement automated positioning of laser beam 120 by coupling a computer to a positioning mechanism and programming the computer to control the positioning and power to the laser beam.

The beam is positioned to remove portions of the ferrite material along the width of the gap through a series of arcuate cuts, each cut being closer to the desired finished width of the gap and overlapping to some extent the previous cut. The series of cuts is performed on each side of the head gap, but the final width of the gap need not be centered with respect to the initial width $W_1$ of the head. The series of cuts is repeated on each side of the head to ensure complete removal of the ferrite material.

Figure 7:
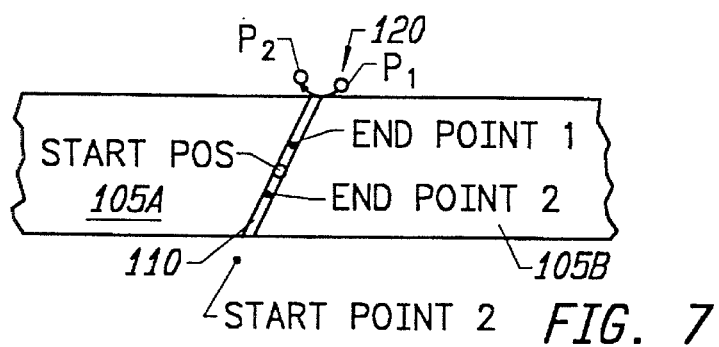
FIGS. 7, 8, 8A, 9, 10, and 11 are exploded views of the pole tips of the head shown in FIGS. 6A–6D demonstrating the method of the invention.

Prior to the fillet process, the gap width $G_W$ extends the entire initial width $W_1$ (CORE_WIDTH) of pole tips 105a and 105b. As shown in FIG. 7, a laser beam 120 which has power sufficient to etch the ferrite material comprising head 100 is positioned relative to the head. A laser suitable for use in the system to generate beam 120 would be, for example, an Adlas Laser, MODEL #421Q/QD having a power output of 3 kW. The start position (START_POS) of laser beam 120 is at the approximate center of gap 110. In the start position, the beam location is positioned, but beam energy is not activated. The start position represents the point at which a first embodiment of the positioning and filleting routine of the present invention commences. Before moving laser beam 120 and initiating sufficient cutting energy, a start point (START_POINT) and end point (END_POINT) along axis $A_W$ for each fillet on each side of the head core must be determined. Axis $A_W$ is defined as the axis bisecting gap 110 at angle $\phi+90°$ with respect to side 108 of head 100. Each start point and end point is calculated (as discussed below) with respect to the width (CORE_WIDTH) of pole tips 105a and 105b, a user-defined sweep angle (SWP_ANGLE), the track width (TRK_WIDTH) of the data tracks to be recorded on the media, the gap length $G_L$, the final desired gap width $G_W$, the laser power (LSR_PWR), the laser velocity (VEL), and the laser acceleration (ACL).

Figure 8:
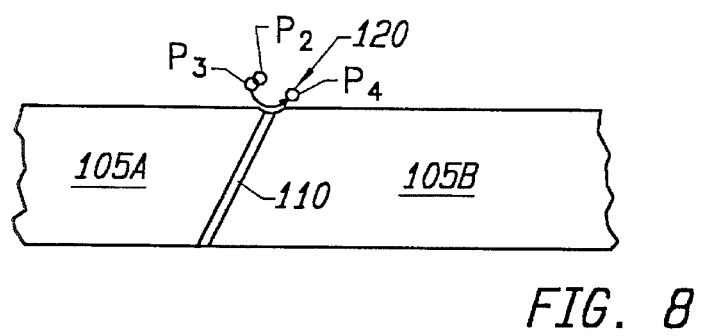
Figure 12:
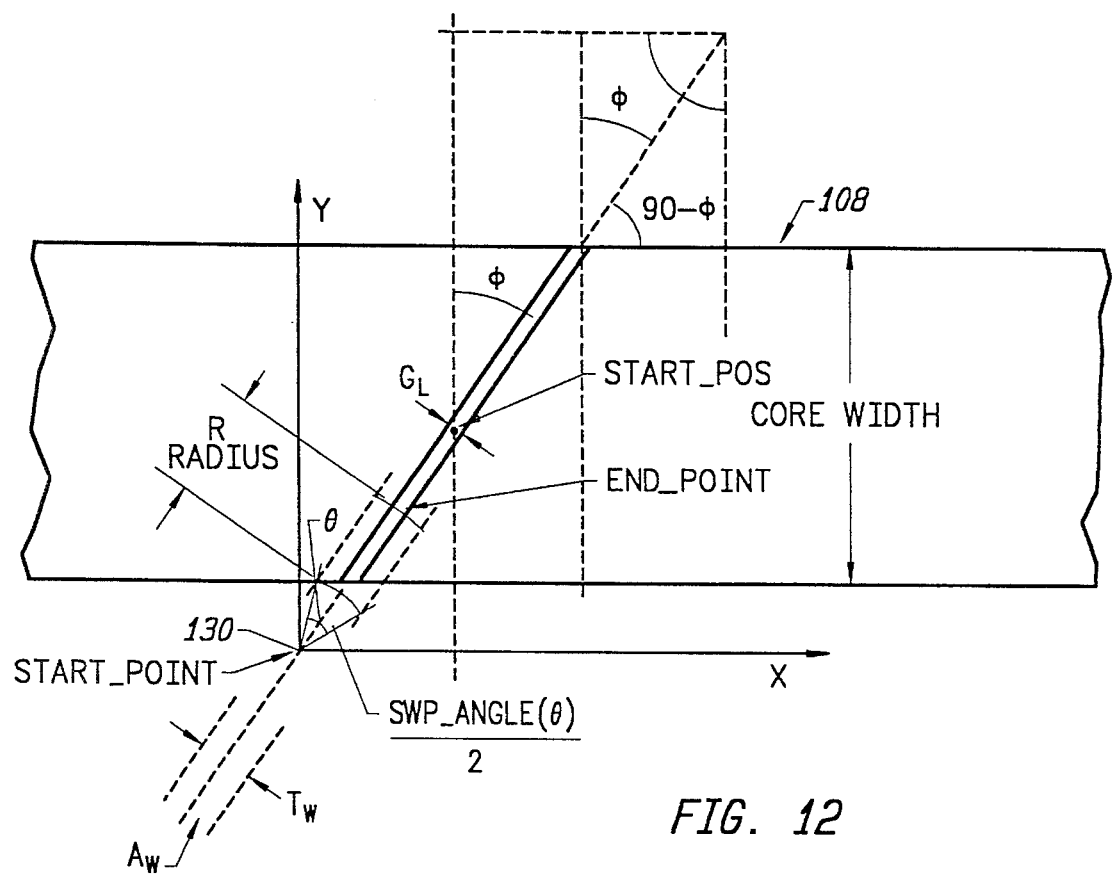
FIG. 12 is a cross-sectional view of the pole tips of the head shown in FIGS. 6A–6D illustrating the conventions and variables used in the method of the present invention.

As shown in FIG. 8, after the first start point START_POINT_1 and first end point END_POINT_1 are calculated, beam 120 is moved to the first arc point $P_1$, the beam energized, and moved along an arcuate path defined by the user-defined sweep angle θ relative to a point of origin 130 on axis $A_W$, shown in FIG. 12, from arc point $P_1$ to arc point $P_2$. During the first arcuate cut, origin 130 is the first start point START_POINT_1. From arc point $P_2$, the beam is incremented in the direction of the cut (toward the center of head gap 110) to point $P_3$, and arced in the reverse direction from point $P_3$ to point $P_4$. During the course of the method, a plurality of arc points $P_n$, $P_{n+1}$ . . . will be calculated and the beam moved from each arc start point $P_n$ to each arc stop point $P_{n+1}$. Accordingly, with each arc of the beam, a portion of material is eliminated and the width of gap 110 shortened. In an automated embodiment, wherein computer control of the process is implemented, the start points, end points, and arc cut points are calculated prior to positioning the beam and stored so that the laser positioning process proceeds fluidly.

Figure 8A:
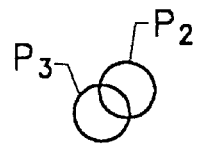

As shown in FIG. 8, and in enlarged view in FIG. 8A, after laser beam 120 is moved from arc point $P_1$ to arc point $P_2$, laser beam 120 will be moved toward the center of gap 110 in a direction parallel to axis $A_W$. The distance of movement is an amount which is, at maximum, equal to the diameter of the beam. While the increment of the beam may be in an amount equal to 100% of the beam diameter, it has been empirically determined that a shorter movement, so that the beam area at point $P_3$ overlaps the area at point $P_2$, is more efficient in removing material from the gap area. In the method of the present invention, this percentage (%_OVERLAP) may be set as desired to achieve optimal removal of ferrite material. It has been empirically determined that an overlap percentage of approximately 10 to 20 percent is optimal to achieve efficient filleting of the core.

From point $P_3$, the beam 120 is arced along an arcuate path identical to that defined between arc points $P_1$ and $P_2$ at sweep angle θ. It should be noted that origin point 130 from which sweep angle θ is determined is likewise incremented by the overlap percentage distance along axis $A_W$. Thus, sweep angle θ and the arcuate path of beam 120 remain constant as each successive arcuate cut is made inward toward the center of gap 110.

Figure 9:
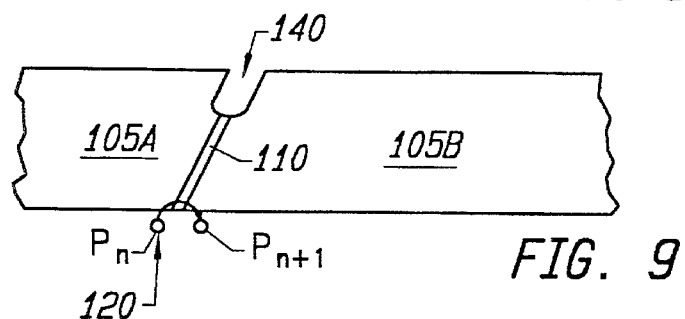

As shown in FIG. 9, processing in this manner continues for a given number of cuts (or "rows") until fillet 140 is formed. It should be noted, with reference to FIG. 12, that the start points and end points signify different conventions with respect to the arcuate cuts. The start points signify the starting point of origin, while the end points signify the location along axis $A_W$ where the fillet portion is to be completed. Once the first fillet portion 140 has been removed on one side of gap 110, a second portion 150 will be removed from a second side of gap 110. To accomplish this, a second start point (START_POINT_2) and second end point (END_POINT_2) on the opposite side of poles 105a and 105b from portion 140 are calculated. In calculating the start points and end points, the orientation of the x-y coordinate plane is constant for both sides of head gap 110. Again, laser beam 120 is arced from a cut point $P_n$ to point $P_{n+1}$ about origin 131, initially defined as start point START_POINT_2, at sweep angle θ.

Figure 10:
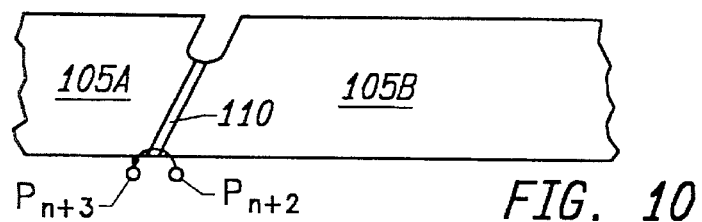
Figure 11:
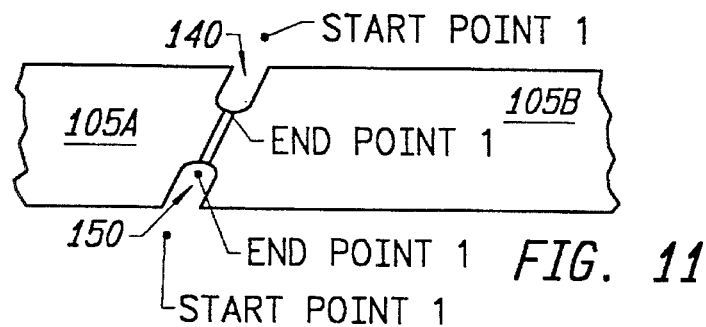

As shown in FIG. 10, processing continues with additional cut points $P_{n+2}$ and end points $P_{n+3}$ until the second fillet area 150 is completed (FIG. 11). In order to assure complete removal of the ferrite material from fillet areas 140 and 150, the process shown in FIGS. 7–11 may be repeated a number of times so that the same series of arcuate cuts is made in each fillet area 140, 150 an integral number of times. Generally, this includes alternatingly cutting each fillet area from start point to end point. For example, the beam cuts from START_POINT_1 to END_POINT_1, then from START_POINT_2 to END_POINT_2, then returns to START_POINT_1 to END_POINT_2, and so forth. Depending on the type of material used, empirical determination will reveal the number of successive repetitions over each fillet area which are necessary to accomplish complete removal of the ferrite material.

In accordance with the method of the invention, the successive arcuate cuts are made utilizing the start points (START_POINT_1, START_POINT_2) and end points (END_POINT_1, END_POINT_2) to define the length or radius R of the cutout regions 140, 150 along the length of gap 110. In the process of the present invention, the start points represent the location on axis $A_W$ defined as the origin for the sweep angle. The start points are determined by calculating the hypotenuse of the defined sweep angle (SWP_HYP) and using the (SWP_HYP) to find the origin point along axis $A_W$ (FIG. 12). The particular method utilized to calculate the start points is described below.

To calculate the hypotenuse of the sweep angle (SWP_HYP), Equation 1 may be used:

$$\text{SWP\_HYP} = \frac{\text{TRIM WIDTH}}{2\sin\left(\frac{\text{SWP\_ANGLE}}{2}\right)} \quad \text{Equation 1}$$

Once SWP_HYP is calculated, calculation of the start points and end points requires the determination of whether the hypotenuse of the sweep angle divided by two (SWP_HYP/2) is greater than or equal to the absolute value of the azimuth angle φ, |AZIMUTH (φ)|. This is because the azimuthal angle φ represents the angular distance between the orientation of axis $A_W$ and a line normal to side 108 of the core, and if SWP_ANGLE/2 exceeds the absolute value of this angle, the position of the start point along axis $A_W$ must be multiplied by the hypotenuse of the sweep angle to correct for the large arc of beam 120. If SWP_HYP/2≧|AZIMUTH(φ)|, the method utilizes the equations set forth in equation set A to calculate, in (x,y) coordinates, the start and end points based on the conventions represented in FIG. 12.

Set A

START_POINT(y) =

$$\text{Y\_POS\_CURRENT} + \frac{\text{CORE WIDTH}}{2} + \text{SWP\_HYP}$$

START_POINT(x) =

$$\text{X\_POS\_CURRENT} + \frac{\left[\frac{\text{CORE WIDTH}}{2} + \text{SWP\_HYP}\right]}{\tan(90 - \phi)}$$

END_POINT(x) =

$$\text{X\_POS\_CURRENT} = \frac{\left[\frac{\text{TRACK WIDTH}}{2} + \text{SWP\_HYP}\right]}{\tan(90 - \phi)}$$

END_POINT(y) =

$$\text{Y\_POS\_CURRENT} + \frac{\text{TRACK WIDTH}}{2} + \text{SWP\_HYP}$$

If SWP_ANGLE/2 <|AZIMUTH(φ) |, equation set B is utilized to calculate the start point and end points.

Set B $$\text{START\_POINT(x)} = \text{X\_POS\_CURRENT} + \frac{\left[\frac{\text{CORE WIDTH}}{2} + \text{SWP\_HYP}*\cos\left(\frac{\phi - \text{swp}}{2}\right)\right]}{\tan(90 - \phi)}$$

$$\text{START\_POINT(y)} = \text{Y\_POS\_CURRENT} + \frac{\text{CORE WIDTH}}{2} + \text{SWP\_HYP}*\cos\left(\frac{\phi - \text{SWP\_ANGLE}}{2}\right)$$

$$\text{END\_POINT(x)} = \text{X\_POS\_CURRENT} + \frac{\left[\frac{\text{TRACK WIDTH}}{2} + \text{SWP\_HYP}\right]}{\tan(90 - \phi)}$$

$$\text{END\_POINT(y)} = \text{Y\_POS\_CURRENT} + \frac{\text{TRACK WIDTH}}{2} + \text{SWP\_HYP}$$

As noted above, the start points and end points are defined in terms of their positions in the xy plane. Hence, the variables listed above as X_POS_CURRENT and Y_POS_CURRENT are the x and y coordinates of the position of the laser beam 120 at the start position (START_POS) at reference number 110.

Leading edge 142 (FIG. 13) of region 140 thus defines one side of the length $G_L$ of gap 110. Because the length of region 140 is much greater than gap 110, magnetic flux in the circuit formed by the pole tips encounters greater resistance at region 140 and is therefore channeled to the gap region having length $G_L$. The number of cuts in defining region 140 is essentially determined by the input power of the laser, the trim width ($T_W$) (or beam width) of the laser, the overlap percentage (%_OVERLAP), and the core width $D_1$. The radius R is defined as the length of the cut for region 140 as shown in FIG. 12.

Figure 13:
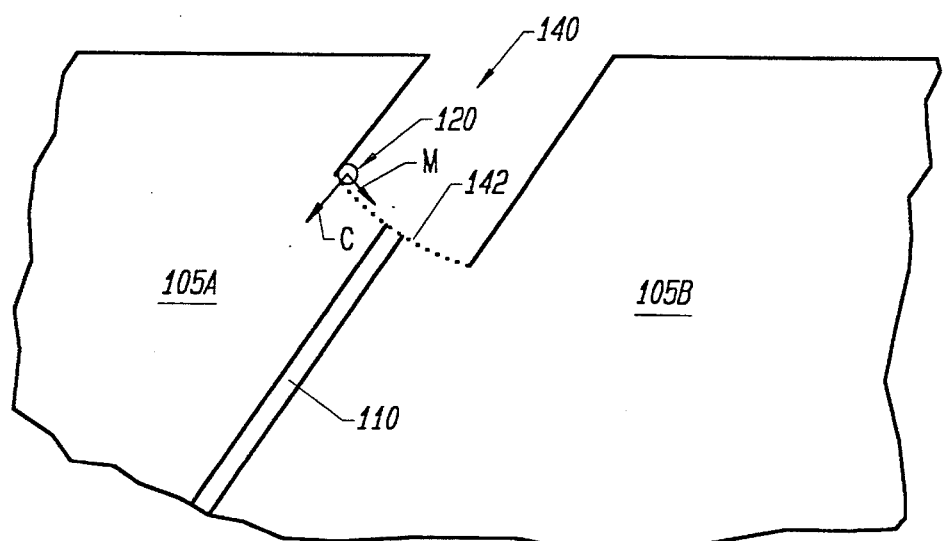
FIG. 13 is an exploded view of the interaction between the laser used in the present invention in relation to the pole tips of the head shown in FIGS. 6A–6D.

FIG. 13 is an exploded representation of fillet area 140 and head poles 105a and 105b. A unique feature of the present invention is the fact that beam 120 is always moving along vector M, the laser cutting direction, or the reverse of vector M (e.g., a vector having a direction 180° opposite of vector M), which is perpendicular to the direction of the fillet along line $A_W$, shown as vector C. Because the motion of beam 120 is perpendicular to the direction of cutting, heat dissipation from the beam is minimized in the fillet direction and is dispersed perpendicular to the width of the gap. Heat dissipation is, therefore, greatest in the direction of vector M, yielding a high degree of definition of the edge 142.

As noted above, in one embodiment of the present invention, positioning of laser beam 120 is directed by computer control. One method for implementing the process of the present invention is set forth in the source code attached hereto. These variables including the following:

%_OVERLAP: the distance that beam 120 will move along axis $A_W$ which can be based on the percentage of beam area which will overlap the preceding beam area cut;

SWP_ANGLE: the sweep angle θ;

STRT_POS: the start position of laser beam;

RADIUS: the length of the cut/fillet area;

AZIMUTH: the angle defined between axis $A_W$ and a line normal to edge 108 of pole tips 105a and 105b;

LASER_PWR: the power of the laser beam;

LASER_VEL: the velocity of the laser beam;

LASER_ACCL: the acceleration of the laser beam;

TRACK_WIDTH: the width of the data track to be recorded onto the magnetic medium.

CORE_WIDTH: the width of the laser core.

TRIM_WIDTH: the desired width of the fillet cuts.

PASSES: the number of times the laser will go over each fillet section 140, 150.

It should be noted that the radius R is assumed to be a defined variable in the first embodiment of present invention, but could just as easily be calculated based on input values for the data track width, and sweep angle θ. Indeed, the second embodiment of the present invention calculates the value of the radius, as discussed below. Various embodiments of the invention are well within contemplation of one of average skill in the art. For example, all start points and end points may be calculated for each cut on both sides of pole tips 105a, 105b in advance, or as each cut is made. In one embodiment, when one side of the head is filleted (e.g., fillet 140) and, when the radius R has been achieved, the beam moves to the opposite side of the pole tips 105a and 105b and begins cutting fillet 150. This sequence of filleting cuts 140 and 150 repeats the user-defined number of times (PASSES) to achieve total removal of the core material at each side of the gap. Alternatively, one fillet may be cut the preset number of times before proceeding to the opposite cut on the other side of the head.

A second embodiment of the method of the present invention will be described with reference to FIGS. 14–17. The second embodiment of the present invention is useful when preparing and filleting a plurality of heads in sequence, and in particular the eight heads on drum 65, as shown in FIG. 15. The second embodiment can be used a number of times to fillet each of the eight heads, and is somewhat similar to the first embodiment, but the start position (START_POSITION) and first end point (END_POINT_1) are defined from a common reference point, separate and apart from any relationship to the individual head core itself. The second embodiment of the present invention is similar to the first and thus like terms, reference numbers and variables are used to describe common features of the two embodiments.

In filleting a plurality of heads, additional factors contribute to the accuracy of the filleting process. For example, each of the heads received from a read/write head manufacturer has a slightly different thickness, resulting in slightly different overall initial core widths. While this width can be controlled within tolerances on the order of one/tenth of one milli-inch, variance in the head width coupled with any variation of the mounting of the head on drum 65 contributes to inaccuracy in the positioning of one head core with respect to other cores on the drum.

In addition, variations in the operating temperature at which the method of the present invention is conducted can result in thermal expansion and contraction of the head on the order of 100µ inches per 10° F. change in temperature. Thus, when cutting a plurality of heads, temperature control of the head drum and filleting area is a primary concern. One option which may be used in conjunction with the method of the present invention is the use of thermo-electric coolers on a fixture holding the head assembly.

The second embodiment of the present invention employs a start/mark position/first end point on each of the heads which is derived from a common reference point not dependent on the structure of the heads. In the first embodiment, the start position is the approximate center point of the head gap. In the second embodiment, the start/mark position is defined as the first end point (END_POINT_1) of fillet 140-1. This mark/start point is defined with respect to rotational axis 63 of the read/write assembly.

The mark/start/first end point is defined with respect to the fillet portion on the outer edge of the drum and provided with a laser mark. This ensures that the arcuate path of the head, after the filleting process is completed, will not exceed a constant radial distance from the center of the head drum. In addition, the gap lengths of all heads will be defined relative to this constant radial distance from the rotational axis of the head drum.

Figure 14:
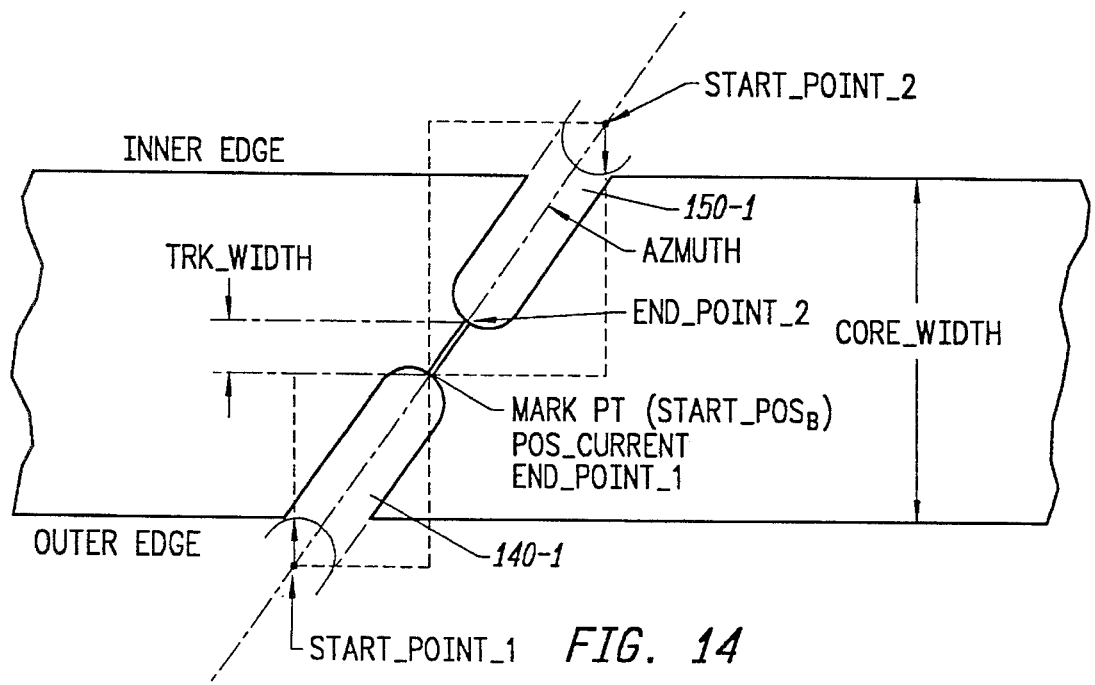
FIG. 14 is a cross-sectional view of the pole tips of FIG. 12 illustrating the conventions and variables utilized in employing the second embodiment of the method of the present invention.

As shown in FIG. 14, the first end point (END_POINT_1) serves as the start position (START_POS) and is a laser marked point (MARK_PT) for the second embodiment of the method of the present invention. In this embodiment of the method, the first end point is always the end point of fillet 140-1, which is cut along the outer edge of core 100. This mark point serves as the basis for calculation of start points (START_POINT_1, START_POINT_2) and the second end point (END_POINT_2), which define the fillet limits in cutting the core. Calculation of the start points and end points consequently defines the radius for fillets 140-1 and 150-1. As with the first embodiment, calculation of the start points and end points depends on the relationship of the azimuthal angle and the sweep angle. Thus, four different equation sets are utilized in calculating the start and end points.

If the azimuthal angle is greater than or equal to zero, and the sweep angle divided by two is greater than or equal to the absolute value of the azimuthal angle e.g., (AZIMUTH($\phi$)$\geq$0) and (SWP_ANGLE/2) $\geq$ |AZIMUTH($\phi$)|), then equation Set C is used to calculate the start and end points:

Equation set E is used to calculate the start and end points if the azimuthal angle is greater than or equal to zero (AZIMUTH($\phi$)$\geq$0) and the sweep angle divided by zero is less than the absolute value of the azimuthal angle ((SWP_ANGLE/2)<|AZIMUTH($\phi$)|).

| Set C | |
|---|---|
| START_POINT_X1 = | X_POS_CURRENT− (0.5· (CORE_WIDTH − TRACK_WIDTH) + SWP_HYP) · TAN( $\pi$/180) · |AZIMUTH ($\phi$)|) |
| START_POINT_Y1 = | Y_POS_CURRENT− (0.5)· (CORE_WIDTH − TRACK_WIDTH) + SWP_HYP) |
| END_POINT_X1 = | X_POS_CURRENT |
| END_POINT_Y1 = | Y_POS_CURRENT |
| START_POINT_X2 = | X_POS_CURRENT + (0.5· (CORE_WIDTH + TRACK_WIDTH) + SWP_HYP) · TAN( $\pi$/180) · |AZIMUTH|) |
| START_POINT_Y2 = | Y_POS_CURRENT + (0.5· (CORE_WIDTH + TRACK_WIDTH) + SWP_HYP) |
| END_POINT_X2 = | X_POS_CURRENT + TRACK_WIDTH·TAN( $\pi$/180) · |AZIMUTH ($\phi$) |) |
| END_POINT_Y2 = | Y_POS_CURRENT + TRACK_WIDTH |

Equation Set D is used to calculate the start and end points if the azimuthal angle is less than zero (AZIMUTH$\phi$<0) and the sweep angle divided by two is greater than or equal to the absolute value of the azimuthal angle ((SWP_ANGLE/2)$\geq$|AZIMUTH($\phi$)|):

| Set D | |
|---|---|
| START_POINT_X1 = | X_POS_CURRENT + (0.5· (CORE_WIDTH − TRACK_WIDTH) + SWP_HYP) · TAN( $\pi$/180) · |AZIMUTH ($\phi$) |) |
| START_POINT_Y1 = | Y_POS_CURRENT − (0.5· (CORE_WIDTH − TRACK_WIDTH) + SWP_HYP) |
| END_POINT_X1 = | X_POS_CURRENT |
| END_POINT_Y1 = | Y_POS_CURRENT |
| START_POINT_X2 = | X_POS_CURRENT − (0.5)· (CORE_WIDTH + TRACK_WIDTH) + SWP_HYP) · TAN( $\pi$/180) · | (AZIMUTH ($\phi$) |) |
| START_POINT_Y2 = | Y_POS_CURRENT + (0.5 (CORE_WIDTH + TRACK_WIDTH) + SWP_HYP) |
| END_POINT_X2 = | X_POS_CURRENT − TRACK_WIDTH·TAN ( $\pi$/180) · | (AZIMUTH ($\phi$) |) |
| END_POINT_Y2 = | Y_POS_CURRENT + TRACK_WIDTH |

| Set E | |
|---|---|
| START_POINT_X1 = | X_POS_CURRENT − (0.5· (CORE_WIDTH − TRACK_WIDTH) + SWP_HYP· COS ( (π/180) · (|AZIMUTH (φ) | − 0.5·SWP_ANGLE) ) ) · TAN ( (π/180) · |AZIMUTH (φ) |) |
| START_POINT_Y1 = | Y_POS_CURRENT − (0.5· (CORE_WIDTH − TRACK_WIDTH) + SWP_HYP·COS ( (π/180) · | (AZIMUTH (φ) | − 0.5·SWP_ANGLE) ) ) |
| END_POINT_X1 = | X_POS_CURRENT |
| END_POINT_Y1 = | Y_POS_CURRENT |
| START_POINT_X2 = | X_POS_CURRENT + (0.5· (CORE_WIDTH + TRACK_WIDTH) + SWP_HYP· COS( (π/180) · |AZIMUTH (φ) | − 0.5·SWP_ANGLE) ) ·TAN ( (π/180) · |AZIMUTH (φ) |) |
| START_POINT_Y2 = | Y_POS_CURRENT + (0.5· (CORE_WIDTH + TRACK_WIDTH) + SWP_HYP· COS( (π/180) · |AZIMUTH (φ) | − 0.5·SWP_ANGLE) ) ) ·TAN((π/180) · |AZIMUTH (φ) |) |
| END_POINT_X2 = | X_POS_CURRENT + TRACK_WIDTH·TAN ( (π/180) · |AZIMUTH (φ) |) |
| END_POINT_Y2 = | Y_POS_CURRENT + TRACK_WIDTH |

Equation set F is used to calculate the start and end points if the azimuthal angle is less than zero (AZIMUTH($\phi$)<0) and the sweep angle divided by two is less than the absolute value of the azimuthal angle ((SWP_ANGLE/2)<|AZIMUTH($\phi$)|):

tion, in part, reflects the methodology presented in the source code used in implementing the second embodiment in the apparatus of the present invention.

FIG. 16 illustrates the process flow second embodiment of the method as embodied in the source code set forth in

| Set F | |
|---|---|
| START_POINT_X1 = | X_POS_CURRENT + (0.5· (CORE_WIDTH − TRACK_WIDTH) + SWP_HYP· COS( (π/180) · ( |AZIMUTH (φ) | − 0.5·SWP_ANGLE) ) ) · TAN( (π/180) · |AZIMUTH (φ) |) |
| START_POINT_Y1 = | Y_POS_CURRENT − (0.5(CORE_WIDTH − TRACK_WIDTH) + SWP_HYP· COS ( (π/180) · ( |AZIMUTH (φ) | −0.5·SWP_ANGLE) ) ) |
| END_POINT_X1 = | X_POS_CURRENT |
| END_POINT_Y1 = | Y_POS_CURRENT |
| START_POINT_X2 = | X_POS_CURRENT − (0.5· (CORE_WIDTH + TRACK_WIDTH) + SWP_HYP· COS ( (π/180) · |AZIMUTH (φ) | − 0.5·SWP_ANGLE) ) ) ·TAN ( (π/180) · |AZIMUTH (φ) |) |
| START_POINT_Y2 = | Y_POS_CURRENT + 0.5· (CORE_WIDTH + TRACK_WIDTH) + SWP_HYP· COS( (π/180) · (|AZIMUTH (φ) | − 0.5·SWP_ANGLE) ) ) |
| END_POINT_X2 = | X_POS_CURRENT − TRACK_WIDTH·TAN ( (π/180) · |AXIMUTH (φ) · |) |
| END_POINT_Y2 = | Y_POS_CLTRRENT + TRACK_WIDTH |

After the start and end points are calculated, the radius for each fillet can be calculated as follows:

```
RADIUS_1 (for fillet 140–1) =
    (END_POINT_X1–START_POINT_X1) · (END_POINT_X1–START_POINT_X1) +
    (END_POINT_Y1–START_POINT_Y1) · (END_POINT_Y1–START_POINT_Y1)
RADIUS_2 (for fillet 150–1) =
    (END_POINT_X2–START_POINT_X2) · (END_POINT_X2–START_POINT_X2) +
    (END_POINT_Y2–START_POINT_Y2) · (END_POINT_Y2–START_POINT_Y2)
```

The second embodiment of the present invention is suitable for use in an automated processing environment wherein the apparatus of the present invention is utilized to fillet a number of heads on a drum. Source code suitable for implementing the second embodiment of the method is set forth in Appendix A of this application. The description of the second embodiment of the method of the present invention, in part, reflects the methodology presented in the source code used in implementing the second embodiment in the apparatus of the present invention.

Appendix A. At step 210, a plurality of heads, such as heads 100₁–100₈, are mounted to a support assembly, such as head drum 65. Head drum 65 is optimally used as the mounting structure during the filleting process since inaccuracies in the mounting process and head fabrication are compensated for by the filleting process. However, it should be understood that the method is not limited to processing heads on the drum and alternative mounting arrangements for the heads may be used. The head drum is optimally also mounted on the read/write assembly 60, and the read/write assembly placed into a mechanical holder which can automatically rotate drum assembly 66. Mounting drum assembly 66 on read/write assembly is optimal since it allows the rotational axis 63 of the head drum assembly 66 to be determined while correcting for any misalignment of the heads as a result of mechanical imperfections of read/write assembly 60. As a result, once the assembly is installed in an arcuate scan tape drive, the path of each head gap 110 relative to the center point will be the same for all heads.

At step 220, the x-y coordinates of rotational axis 63 of drum assembly 66 are determined. Axis 63 is utilized as the point of origin so that each laser mark point (MARK_POINT) for each head $100_1$–$100_8$ is a distance X (FIG. 15) therefrom. The determination of the location of rotational axis 63 of drum assembly 66 can be performed manually, or in an automated manner utilizing a computer vision system coupled to a control computer. Head drum 65 has a machined center bore 67, including machine marks 68 therein, which are utilized to determine the location of rotational axis 63. Rotating machine marks 68 creates a circular pattern, at the center of which is rotational axis 63 which appears as a fixed point relative to the display of the rotating circular pattern. By visually locating the fixed point, rotational axis 63 can be determined by an automated computer vision system coupled to a computer control system allowing automation of the method, or by an individual performing the method of the present invention.

Once rotational axis 63 is located, at step 230, the (x,y) coordinates of a set mark point (in one embodiment, END_POINT_1), for heads $100_1$–$100_8$ are set and marked by a laser mark point (MARK_POINT). The distance "x", shown in FIG. 15, may be predetermined in the method of the present invention. Each head, and head gap, is 45° apart on the head drum, thus once the location of head $100_1$ is determined, the mark point for each subsequent head on the drum is recorded by rotating the head 45° and recording the mark. As discussed above, this mark point is utilized to calculate the arcuate cuts for the method. In one embodiment, the start and stop points for fillets 140-1 and 150-1 on each head are calculated based on this coordinate and the mark point serves as the values X_POS_CURRENT and Y_POS_CURRENT in Equation Sets C–F.

At step 240, certain user-defined variables, necessary for implementation of the method, must be defined in order to complete the filleting process. In the automated method of the present invention, these variables are defined and set in the software as input variables to automatically perform calculations of the arcuate cut points ($P_1$, $P_2$, $P_n$ . . .) of the method the present invention. Those variables which must be input are: %_OVERLAP; SWP_ANGLE; AZIMUTH($\phi$); LASER_PWR; VEL; ACCL; TRACK_WIDTH; CORE_WIDTH; TRIM_WIDTH; and PASSES—(the number of times the laser will go over each fillet section 140, 150).

At step 250, the start points and end points for each fillet 140-1, 150-1 are calculated for each head $100_n$, along with the length of each cut ($RADIUS_1$, $RADIUS_2$) and the orientation angle of the cut ($ANGLE_1$, $ANGLE_2$). The start and end points are calculated dependent upon the relationship between the sweep angle and the azimuth of angle $\phi$ using equation sets C through F, as set forth above. In the method shown in the source code Appendix A, the x-y coordinate plane is maintained for each side of head 100. Thus, the orientation angle compensates for the position of the beam with respect to the center point of the head. The orientation angles are defined as $ANG_1$=90° minus AZIMUTH($\phi$), and $ANGLE_2$=270° minus AZIMUTH($\phi$). This point defines the maximum arcuate path of the laser during each fillet pass (e.g., SWP_ANGLE=180°).

At step 260, the filleting method is performed for the number of PASSES defined by the user. In the embodiment set forth in Appendix A, steps 270–320 are performed for the number of PASSES specified at step 240 as an input variable.

Steps 270 through 320 represent the basic core filleting routine for each head. The process works by alternatively cutting fillets 140-1, between START_POINT_1 and END_POINT_1, then by cutting fillet 150-1 between START_POINT_2 and END_POINT_2. At step 270 the laser power is turned off, and the laser moved to START_POINT_1.

Subroutine 300 operates in the same manner to fillet both sides of gap 110, for fillets 140-1 and 150-1. Step 240 sets the variables in routine 300 as START_POINT_1 and END_POINT_1, while routine 300 is repeated for the second start point START_POINT_2 and end point END_POINT_2 at step 290. In general, routine 300 reflects the calculation of the arc points $P_1$, $P_2$, $P_n$, $P_{n+1}$ . . . and controls movement of the laser between the respective arc points. It should be noted that in calculating the arc set points $P_n$, the x,y coordinates are converted to polar coordinates and the polar coordinates used (in the embodiment of Appendix A) to position laser beam 120.

Initially, at step 310, the actual overlap distance (OVERLAP_DISTANCE), number of rows (ROWS), the hypotenuse (HYP) of the cut width (WIDTH) and a modified value for the RADIUS, are calculated. The modified RADIUS value compensates for the hypotenuse of the cut width by subtracting the hypotenuse of the cut width from the radius and assigning this value as the RADIUS. The overlap distance is the laser width in inches multiplied by the percentage of overlap OVERLAP_DISTANCE = LASER_WIDTH_IN * (100.00-OVERLAP)*0.01. The hypotenuse is the cut width (WIDTH) divided by 2 SIN(($\pi$/180.0)*(SWP_ANGLE/2)) . Thereafter, the hypotenuse is subtracted from the current radius value and this value is used as the RADIUS for the method in routine 300. The number ROWS is simply this modified RADIUS value divided by the overlap distance.

At step 320, the initial arc cut points $P_1$ and $P_2$ are calculated in two dimensions $P_1$(p1_x,p1_y), $P_2$(p2_x, p2_y). In addition, the points designating the end of the final arcuate cut, e.g., the final, ending coordinate points (x_end, y_end), of the fillet, are calculated. The formulas for calculating P1, P2, and x_end,y_end are shown in equation Set G:

Set G $$P1\_X = X\_POS\_CURRENT + HYP*COS\left(\left(\frac{\pi}{180}\right)\left(\frac{SWP\ ANGLE}{2}\right) + ROT\_ANGLE\right)$$

$$P1\_Y = Y\_POS\_CURRENT + HYP*SIN\left(\left(\frac{\pi}{180}\right)*\left(\frac{SWP\ ANGLE}{2}\right) + ROT\_ANGLE\right)$$

$$P2\_X = X\_POS\_CURRENT + HYP*COS\left(\left(\frac{\pi}{180}\right)*\left(ROT\_ANGLE - \left(\frac{SWP\ ANGLE}{2}\right)\right)\right)$$

-continued

Set G $$P2\_Y = Y\_POS\_CURRENT + HYP*SIN\left(\left(\frac{\pi}{180}\right)*\left(ROT\_ANGLE - \left(\frac{SWP\ ANGLE}{2}\right)\right)\right)$$

$$X\_END = X\_POS\_CURRENT + RADIUS*COS\left(\left(\frac{\pi}{180}\right)*ROT\_ANGLE\right)$$

$$Y\_END = Y\_POS\_CURRENT + RADIUS*SIN\left(\left(\frac{\pi}{180}\right)*ROT\_ANGLE\right)$$

(In the following equations, "ROT_ANGLE" is equivalent to ANGLE and is represented in the following equations to match the source code Appendix, as this is the function call used therein to call the value of ANGLE_1 and ANGLE_2.)

Once these initial coordinates are calculated, at step 325, the laser is positioned at point $P_1$ with the power off.

Routines 340–348 control movement of the laser and calculation of the arc cut points $P_n$ based on which row is being cut at a particular time. Steps 340–348 operate for the conditions where a row counter "rr" is less than or equal to the calculated number of rows. At step 330 rr equals 1 and increments each time step 330 is encountered in the process flow.

Routines 340, 342, 344, 346, and 348 each control a specific row condition at which the process is engaged at a particular point. Given the particular row condition, the calculations for the next arc point, (P_x_next, P_y_next), and next center point (x_cntr_next, y_cntr_next), change.

Figure 17:
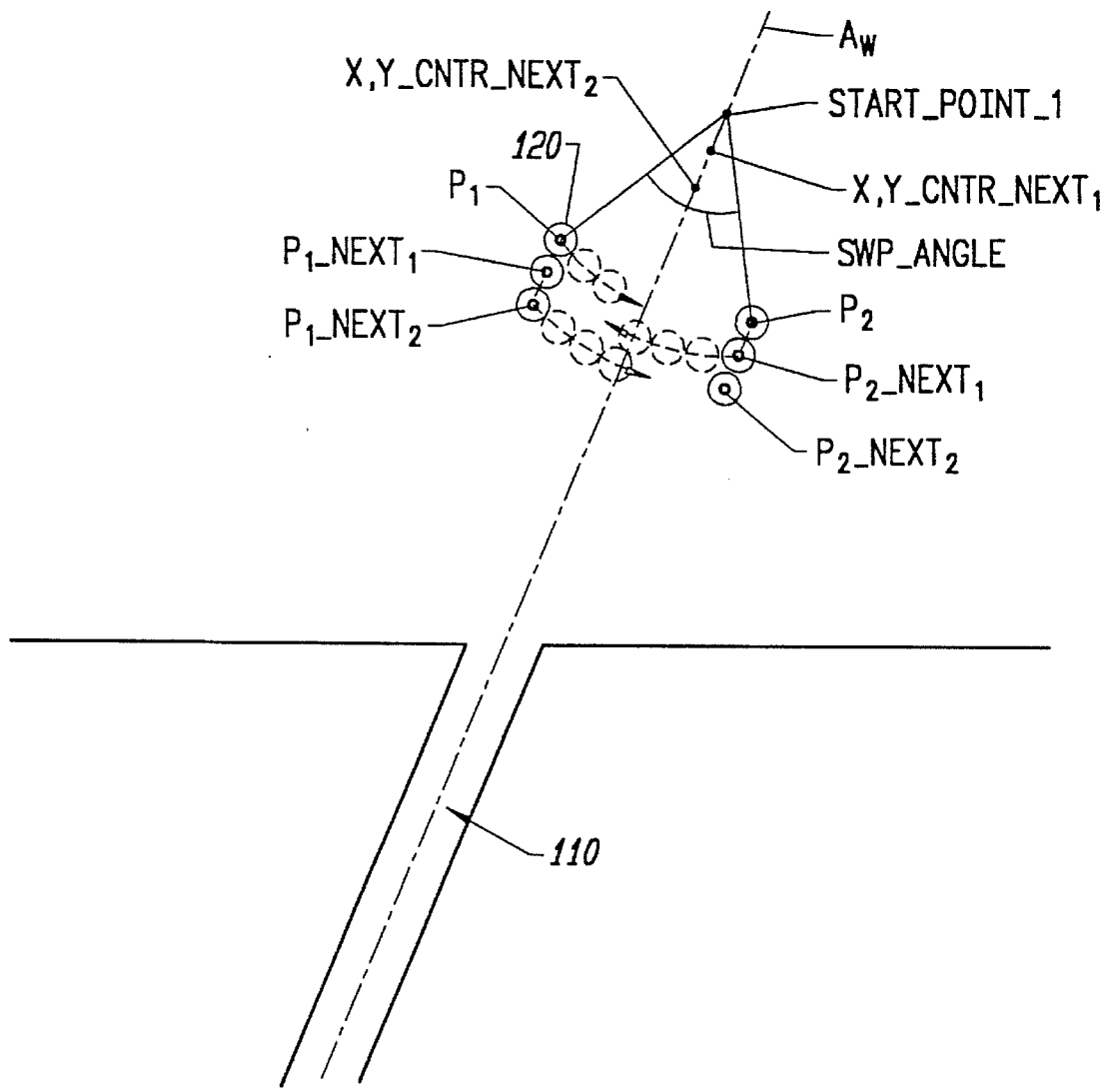
FIG. 17 is an enlarged view of the pole tips and laser beam illustrating a second manner of positioning of the laser beam in accordance with the second embodiment of the method of the present invention.

As will be understood by review of the following description of routines 340–348, and a review of the control software algorithm attached hereto as Appendix A, the method of the second embodiment of the present invention calculates each point of origin x_cntr_next, y_cntr_next and moves the beam at the specified sweep angle about the point of origin to define the arc cut. Only one arc point P_x,y_next, to which the laser is incremented along axis $A_W$, is calculated per step. This difference is illustrated in FIG. 17. As shown therein, laser 120 is arced from $P_1$ to $P_2$, a calculation of $P_1$_next and x,y_cntr_next made, laser 120 moved to $P_1$_next (in the parlance of the first embodiment, $P_3$), and thereafter arced from $P_1$_next at the sweep angle about x_cntr_next, y_cntr_next. Thereafter, $P_2$_next and another x,y_cntr_next calculated and the beam arced at the reverse sweep angle. In the source code appendix, the designations $P_1$ and $P_2$ are used only to denote the initial arc points. These designations, and the arc point coordinates they represent with respect to axis $A_W$, remain constant. The designations "$P_1$_(x,y)_NEXT" and "$P_2$_(x,y)_NEXT" denote the next arc points to which the laser is moved so that in the second embodiment of the present invention, the laser is moved from $P_1$ to $P_2$, and thereafter from $P_2$ to $P_2$_NEXT, then arced, then to $P_1$_NEXT, then arced, then to a second $P_2$_NEXT, and so forth as the variables for $P_1$_NEXT and $P_2$_NEXT are constantly updated.

It should be understood that the second embodiment of the present invention could be performed in accordance with the methodology of the first embodiment of the present invention, and the choice of which particular method to use, or any adaptation thereof, depends on the particular nature of the assembly operation.

Routine 340 controls the condition at row number 1, where the row counter rr equals 1. At routine 340, a calculation of the next center point along axis $A_W$ (X_CNTR_NEXT, Y_CNTR_NEXT), and the next arc point $P_2$(P2_X_NEXT, P2_Y_NEXT) are made. Routine 340 then controls movement of the laser from point $P_1$ (to which the laser was moved under step 325 above) to the next arc point $P_2$ about an arc defined by the position of the center point (X_CNTR_NEXT, Y_CNTR_NEXT) and the sweep angle, either in a positive direction, (+)SWP_ANGLE, or a reverse direction, (−)SWP_ANGLE.

The formulas for calculating the next center point (X_CNTR_NEXT, Y_CNTR_NEXT) and next $P_2$ point (P2_X_NEXT, P2_Y_NEXT) at step 340 are shown as Equation Set H below:

Set H $$X\_CNTR\_NEXT = X\_POS\_CURRENT + OVERLAP\_DIS*(RR-1)*COS\left(\left(\frac{\pi}{180}\right)*ROT\_ANGLE\right)$$

$$Y\_CNTR\_NEXT = Y\_POS\_CURRENT + OVERLAP\_DIS*(RR-1)*SIN\left(\left(\frac{\pi}{180}\right)*ROT\_ANGLE\right)$$

$$P2\_X\_NEXT = P2\_X + OVERLAP\_DIS*RR*COS\left(\left(\frac{\pi}{180}\right)*ROT\_ANGLE\right)$$

$$P2\_Y\_NEXT = P2\_Y + OVERLAP\_DIS*RR*SIN\left(\left(\frac{\pi}{180}\right)*ROT\_ANGLE\right)$$

After the next arc point (P2_NEXT) and center point is calculated in accordance with Equation Set H, the laser is arced at positive sweep angle ((+)SWP_ANGLE) to position laser 120 at point $P_2$. Routine 340 then moves beam 120 to point P2_NEXT.

Routine 342 deals with the situation where the row is an even numbered row and not the last row of the cut (e.g., rr =2, 4, 6, 8 . . .). In such case, the formulas for calculating the next center point along axis $A_W$ and the next $P_1$ point (P1_NEXT) are given as Equation Set I:

Set I $$X\_CNTR\_NEXT = X\_POS\_CURRENT + OVERLAP\_DIS*(RR-1)*COS\left(\left(\frac{\pi}{180}\right)*ROT\_ANGLE\right)$$

$$Y\_CNTR\_NEXT = Y\_POS\_CURRENT + OVERLAP\_DIS*(RR-1)*SIN\left(\left(\frac{\pi}{180}\right)*ROT\_ANGLE\right)$$

$$P1\_X\_NEXT = P1\_X + OVERLAP\_DIS*RR*COS\left(\left(\frac{\pi}{180}\right)*ROT\_ANGLE\right)$$

$$P1\_Y\_NEXT = P1\_Y + OVERLAP\_DIS*RR*SIN\left(\left(\frac{\pi}{180}\right)*ROT\_ANGLE\right)$$

After the next arc point $P_1$_NEXT and center point are calculated in accordance with Equation Set J, with beam 120 at the last point P2_NEXT after movement thereto at step 340 (or step 346 as set forth below), beam 120 is moved at an arc about the next center point (X,Y)_CNTR_NEXT at a reverse sweep angle ((−)SWP_ANGLE) and beam 120 thereafter incremented to point P1_NEXT.

Subroutine 344 deals with the situation where the row number is an odd row and is not the last row of the cut (e.g., rr =3, 5, 7, 9 . . .). The equations for calculating the next center point and next P$_2$ point P2_NEXT are given as equation Set J:

Set J

X_CNTR_NEXT = X_POS_CURRENT +

$$\text{OVERLAP\_DIS*(RR}-1)\text{ *COS}\left(\left(\frac{\pi}{180}\right)\text{*ROT\_ANGLE}\right)$$

Y_CNTR_NEXT = Y_POS_CURRENT +

$$\text{OVERLAP\_DIS*(RR}-1)\text{ *SIN}\left(\left(\frac{\pi}{180}\right)\text{*ROT\_ANGLE}\right)$$

P2_X_NEXT = P2_X +

$$\text{OVERLAP\_DIS*RR*COS}\left(\left(\frac{\pi}{180}\right)\text{*ROT\_ANGLE}\right)$$

P2_Y_NEXT = P2_Y +

$$\text{OVERLAP\_DIS*RR*SIN}\left(\left(\frac{\pi}{180}\right)\text{*ROT\_ANGLE}\right)$$

Once the next arc point (P2_NEXT) and next A$_W$ center point are calculated in accordance with Equation Set J, the routine moves the laser at the arc path at a positive sweep angle about (X,Y)_CNTR_NEXT, and thereafter moves beam 120 to point P2_NEXT.

It should be noted that the P1_NEXT, P2_NEXT, and (X,Y)_CNTR_NEXT are calculated with reference to the sequential row numbers (rr). These increments are equivalent to movement of the overlap distance away from p1, p2 and parallel to axis A$_W$ toward ENDPOINT_1.

Routine 346 deals with the situation where the last row of the fillet has been reached, and the last row is an even row. In such cases, only the (x,y) center point along axis A$_W$ need be calculated and the laser arced about the center point at the reverse sweep angle. The formulas for calculating the next (x,y) center points at this step are shown in Equation Set K:

Set K

X_CNTR_NEXT = X_POS_CURRENT +

$$\text{OVERLAP\_DIS*(RR}-1)\text{ *COS}\left(\left(\frac{\pi}{180}\right)\text{*ROT\_ANGLE}\right)$$

Y_CNTR_NEXT = Y_POS_CURRENT +

$$\text{OVERLAP\_DIS*(RR}-1)\text{ *SIN}\left(\left(\frac{\pi}{180}\right)\text{*ROT\_ANGLE}\right)$$

After the next center point is calculated in accordance with Equation Set K, beam 120 is arced at (−)SWP_ANGLE about the center point.

Finally, routine 348 deals with the situation where the last row of the fillet is an odd row. Again, the next center point is calculated and the laser arced about the center point at the positive sweep angle. Formulas for calculating the next center point at step 348 are given as equation Set L:

Set L

X_CNTR_NEXT = X_POS_CURRENT +

Set L $$\text{OVERLAP\_DIS*(RR}-1)\text{ *COS}\left(\left(\frac{\pi}{180}\right)\text{*ROT\_ANGLE}\right)$$

Y_CNTR_NEXT = Y_POS_CURRENT +

$$\text{OVERLAP\_DIS*(RR}-1)\text{ *SIN}\left(\left(\frac{\pi}{180}\right)\text{*ROT\_ANGLE}\right)$$

Again, once the X,Y_CNTR_NEXT points are calculated in accordance with Set L, beam 120 is arced thereabout at (+)SWP_ANGLE.

In each of steps 346, 348, the final arcuate movement will draw beam 120 over END_POINT_1, thus ensuring the proper length of the fillet portion.

At step 350, once the row counter has incremented to the calculated number of rows (RR=ROWS), fillet 140-1 is complete and the process begins fillet 150-1. At step 290, the fillet routine for the second fillet 150-1 on a given head 100$_n$ is defined so that the method works between START_POINT_2 and END_POINT_2 and includes routine 300 which calculates the arc points and increments the beam in a like manner to that described with respect to step 270, but based on the variables: START_POINT_2, END_POINT_2, RADIUS_2, and ANGLE 2, using the same TRIM_WIDTH, SWP_ANGLE, OVERLAP, VEL, and ACL.

At step 290, laser 120 is moved to the second start point START_POINT_2 with the power off.

Routine 300 under step 290 runs steps 310–350 for the specified number of rows completing fillet 150. At step 295, if the increment counter has not reached the number of PASSES specified, steps 260–295 run again until I=PASSES.

It should be understood that the second embodiment of the present invention could be performed in accordance with any number of variations, including sequentially cutting fillets 140-1, 150-1, with all PASSES on fillet 140-1 being performed first, and all PASSES on fillet 150-1 coming thereafter; and/or calculating the particular movement points in a different manner, e.g., using x-y coordinates. As noted above, the second embodiment is preferable in terms of manufacturing a plurality of heads because, in an arcuate scan tape head assembly, it is required that all the head gaps be an equidistant point from the rotational axis of the head drum. Thus, marking the first end point of each cut on each head ensures that the distance from the center point will be equidistant and achieves this objective. Secondly, the use of the particular calculation and rastering method in the second embodiment of the method is somewhat more efficient since less calculations are required to move the laser along the arcuate path, yet the movement pattern satisfies both the heat dissipation goal and incrementing the beam towards the center point of the gap.

Figure 18:
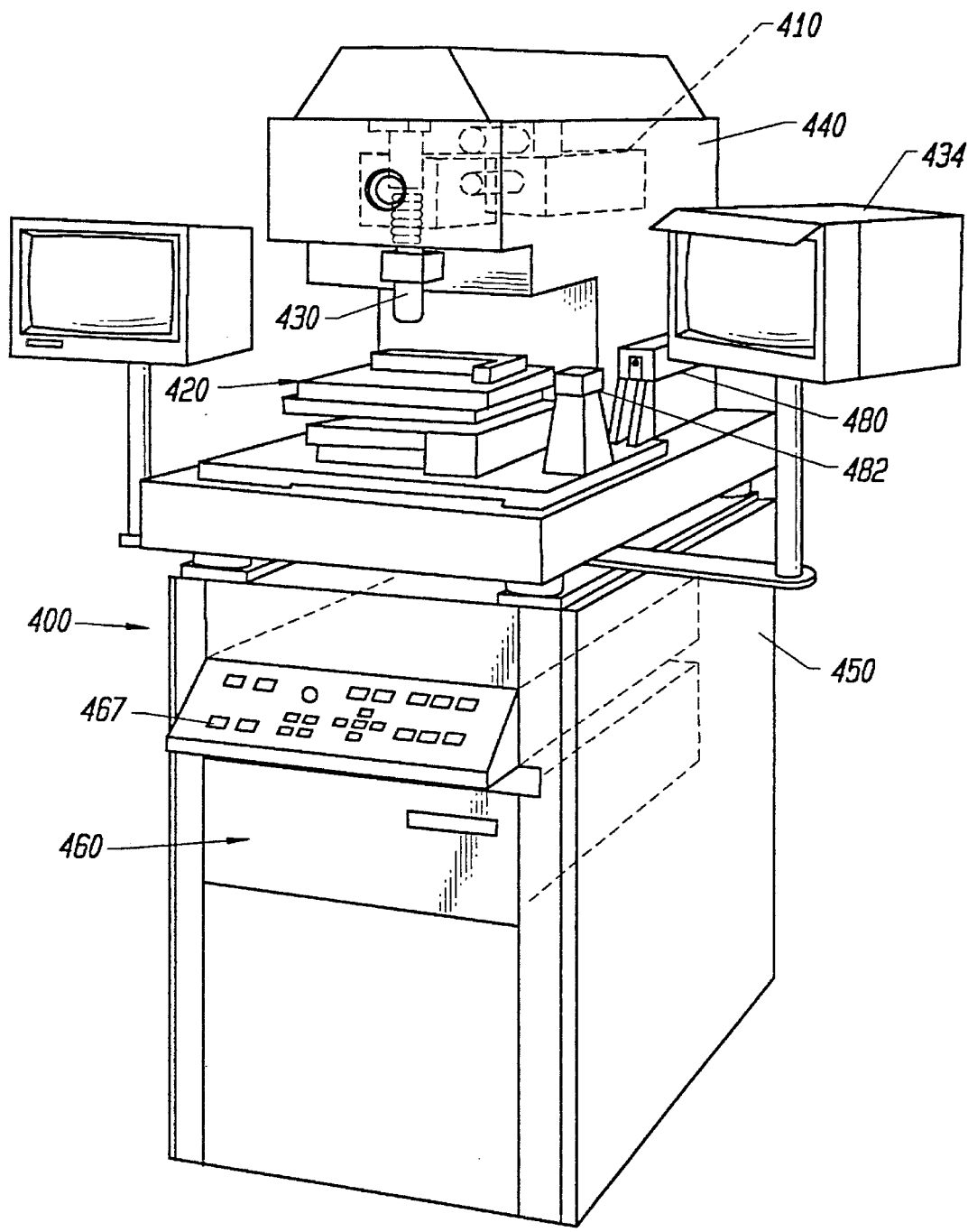
FIG. 18 is a perspective view of an apparatus suitable for implementing the method of the present invention.
Figure 19:
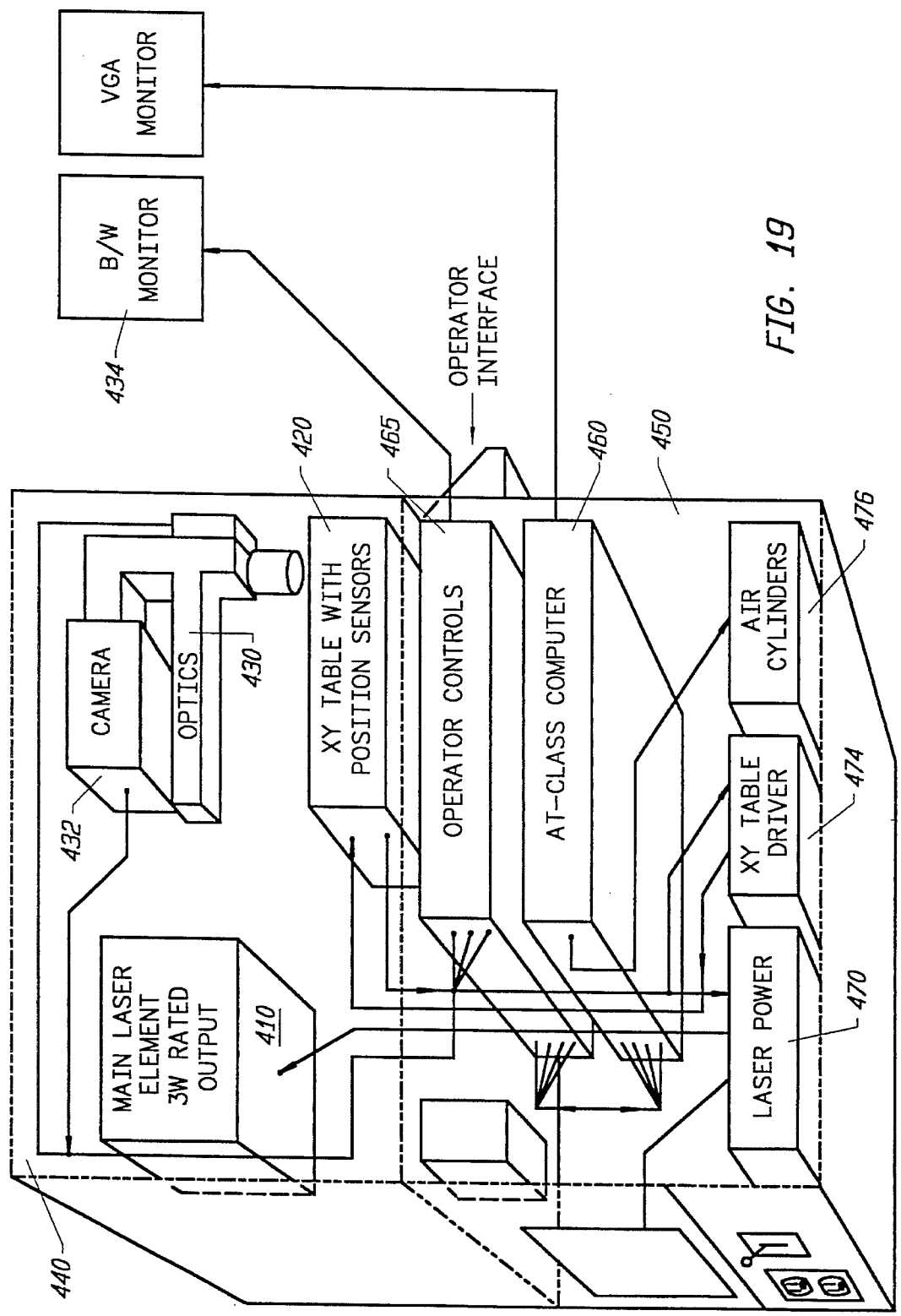
FIG. 19 is a perspective view of the general layout of the control elements of the apparatus shown in FIG. 18.

A number of lasing apparatus are suitable for performing the method of the present invention. An apparatus 400 which provides distinct advantages in performing the method is shown in FIGS. 18 and 19. FIG. 18 is a perspective view of apparatus 400 and FIG. 19 is a layout of the major components of apparatus 400. Apparatus 400 includes a FDA class 4 rated, main laser 410, an x-y positioning table 420, optical elements 430 for directing the output of laser 410 to x-y table 420, and a granite laser housing 440, mounted on top of a steel component housing 450. In manufacturing housing 440, which includes main laser element 410 and optic elements 430 out of granite, maximum stability for the x-y table is assured when the table moves the read/write assembly 60 relative to the beam output from optics 430. Due to the dimensions involved in manufacturing the heads, maximum stability for both beam 120 and the heads when coupled to x-y table 420 is critical to ensuring accurate filleting of the heads. Also provided in the granite housing 440 is a camera 432 which may be coupled to a monitor 434 to allow the user to visually ascertain the status of the cutting process.

Main component housing 450 includes an AT class computer 460 which controls apparatus 400. As shown in FIG. 19, the AT class computer is coupled to operator interface 467 and operator controls 465 which include a x-y table positioning controls, power controls, and camera controls. A monitor 426 and keyboard (not shown) may also be coupled to computer 460. In the embodiment of the source code attached hereto, the code issues status flags in the process currently running, thereby allowing monitoring of the process during operation. Housing 450 also includes a laser power supply 470, AC input 472, an x-y table driver 474, and air cylinders 476 which drive motion of the x-y table. A positioning laser 480 is also provided, with directional laser optics 482, to enable accurate positioning of the x-y table relative to optics 430. Air cylinders 476, coupled to the x-y table, drive the arcuate scanning head assembly mounting fixture 500, shown and described with respect to FIGS. 20–22.

Computer 460 may control the operation of the elements shown in FIGS. 18 and 19 to automate performance of various embodiments of the method of the present invention. The software source code presented in Appendix A there of represents specific control level algorithms which direct the filleting process of the second embodiment of the present invention in computer 460. It should be readily understood that the particular method described herein, and the implementation of those methods are not limited to the particular apparatus described with reference to FIGS. 18 and 19, nor a particular source code set forth in Appendix A.

A computer vision system, including a vision camera 445 and peripheral board for computer 460, may also be provided to completely automate the method of the present invention. The vision system is capable of resolving the location of head gaps 110 and rotational axis 63 when hub 66 is rotated to view the machine marks thereon in accordance with the description set forth above. This allows the apparatus 400 to run either embodiment of the method in an entirely automated manner once the read/write assembly 60 is placed in the ASHA fixture holder 500. A separate monitor (not shown) may be provided to allow the system operator to monitor the input to the vision system. A computer vision system suitable for use with apparatus 400 includes, for example, the 5000 series vision system available from Cognex Corporation, Needham, Mass.

Figure 20:
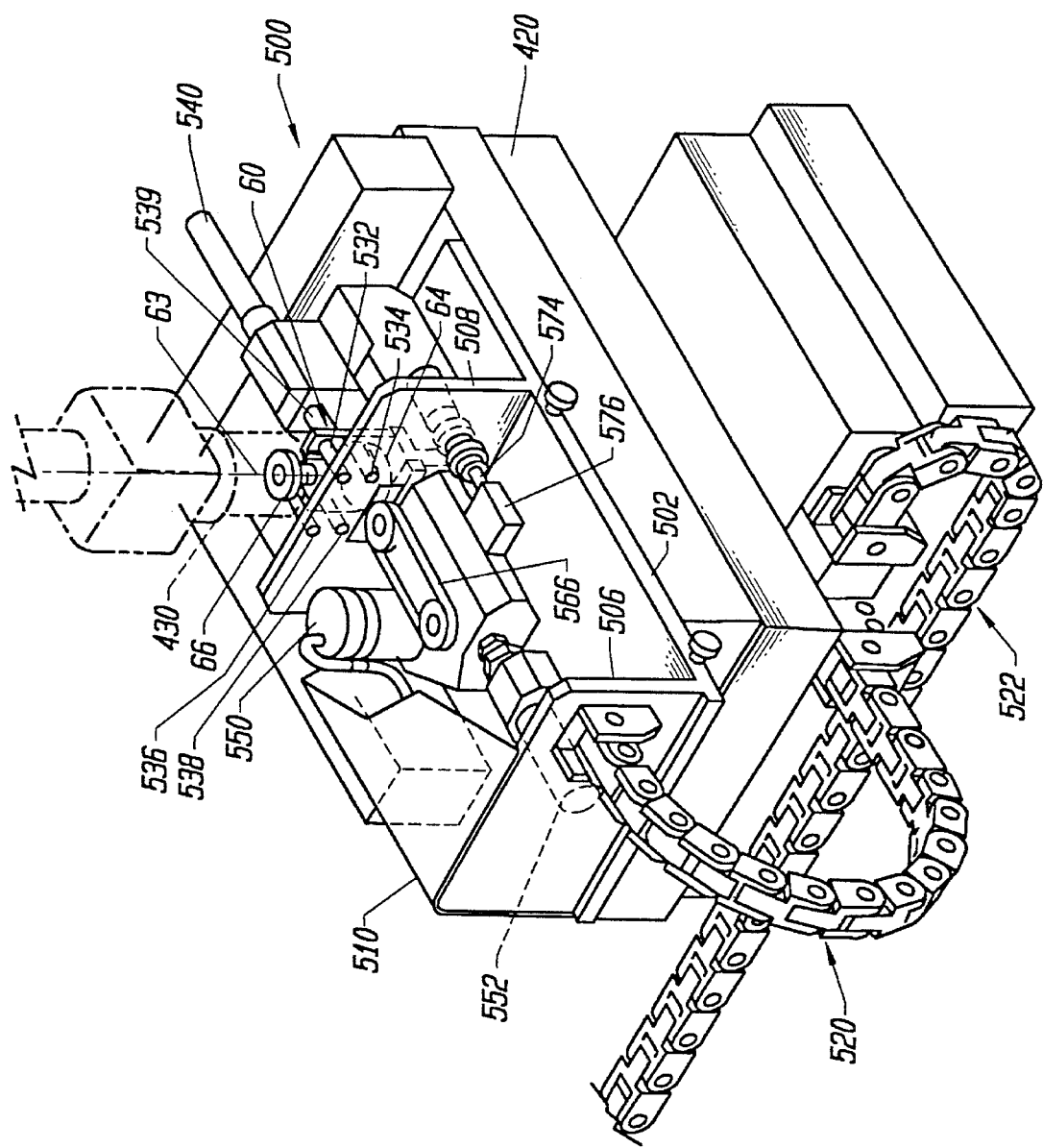
FIG. 20 is a perspective view of a fixture for mounting the head drum assembly of FIG. 5.
Figure 21:
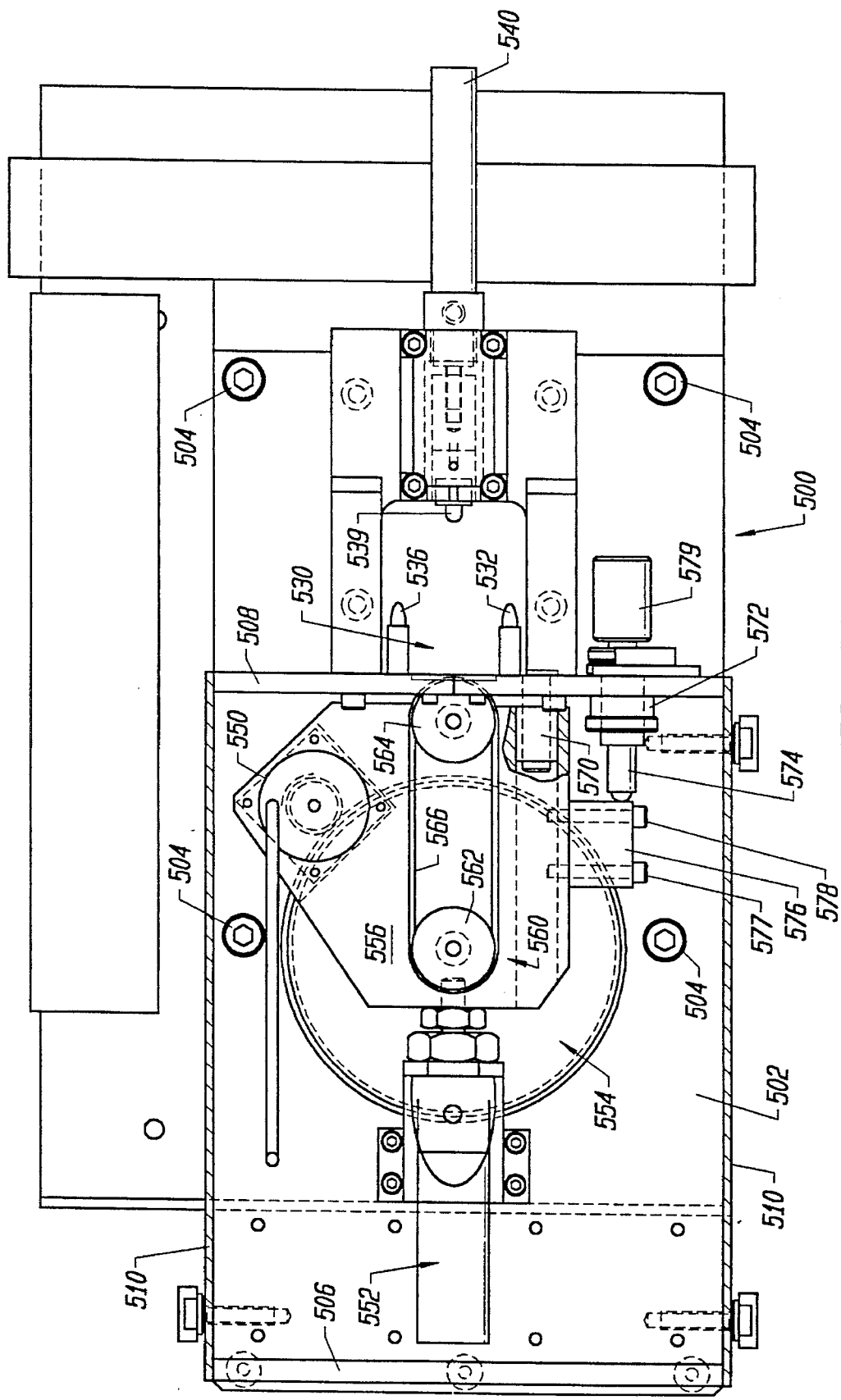
FIG. 21 is a plan view of the fixture shown in FIG. 21.
Figure 22:
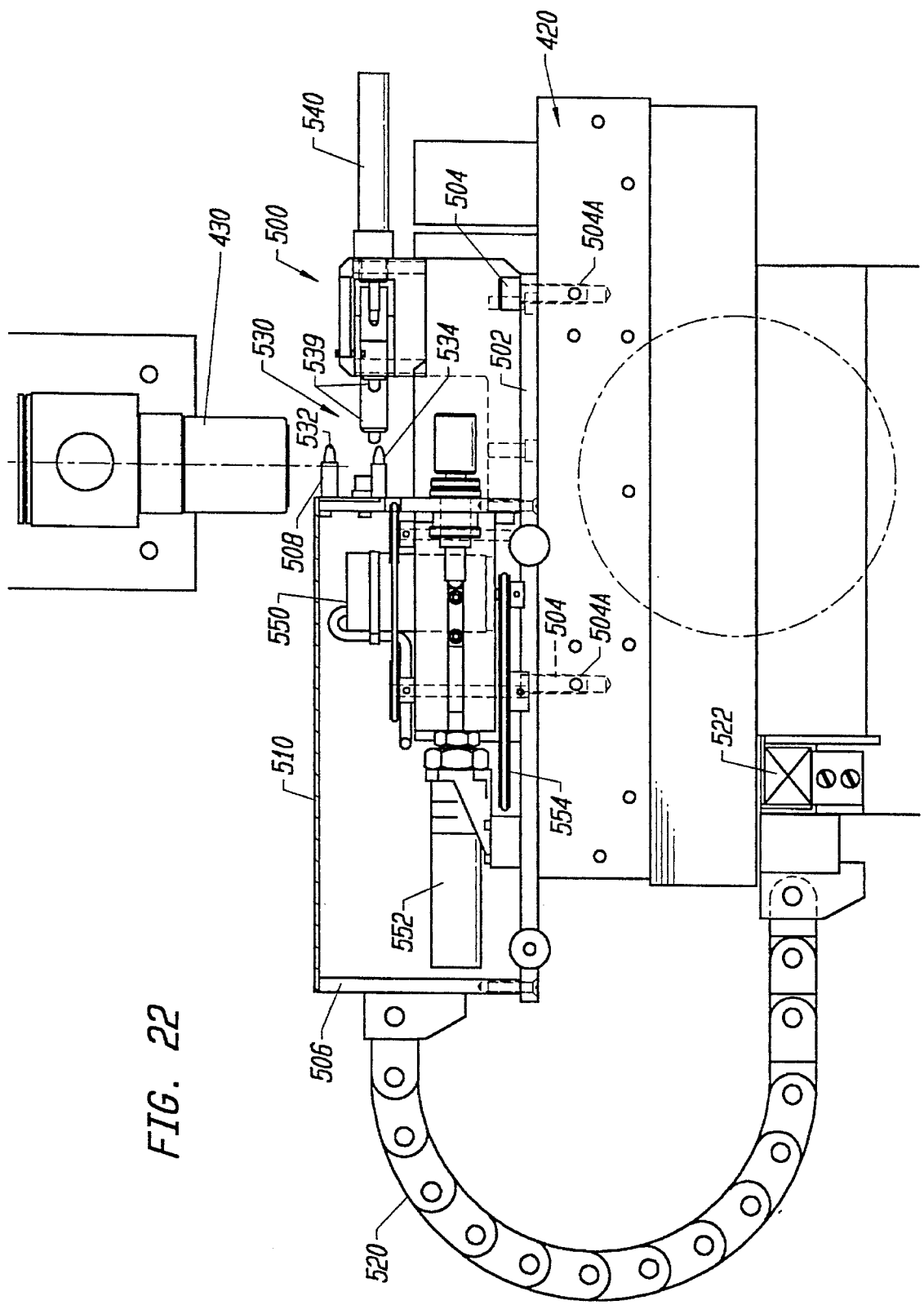
FIG. 22 is a side view of the fixture shown in FIG. 21.

FIGS. 20 and 21 show a fixture 500 for holding the arcuate scan read/write head assembly 60. Fixture 500 is secured to x-y table 420 and coupled to air cylinders 476 to automatically position the read/write assembly 60, with heads $100_1$–$100_8$ mounted thereon, under laser optics 430. Fixture 500 is electrically coupled to computer 460, coupled by air conduits to air cylinders 476, and physically secured to x-y table 420, allowing computer 460 to control all aspects of the process on each of heads $100_1$–$100_8$ on the read/write assembly. FIG. 20 is a perspective view of the read/write fixture 500, and FIGS. 21 and 22 are a plan view and a side view, respectively, of fixture 500. Fixture 500 includes a base 502 which is bolted with four hex nuts 504 into mounting holes 504a in x-y table 420. A rear plate 506 and insert plate 508 are secured to base 502. A cover 510 is secured over the internal components of the fixture. An e-chain cable carrier system 520 secures rear plate 506, and assembly 500, to x-y table 420 at mounting block 522.

A mounting region 530 (FIGS. 21 and 22) for securing the read/write assembly 66 in assembly 500 is defined by four stationary pins 532, 534, 536, 538 mounted to insert plate 508, and a clamp pin 539 which extends, as shown in FIG. 22, to secure the read/write assembly 60 between pins 532, 534 and 536, 538. Pin 539 is powered by air cylinder 540, which may comprise an air cylinder model 0071/D from BIMBA, Inc. Read/write assembly 60 includes two mounting bores 75, 76 (see FIGS. 4, 5) on mounting plate 77 which are used to secure assembly 60 to frame 91 of drive 90. Assembly 60 may be mounted on pins 532 and 538 inserting pins 532, 538 into bores 75, 76 as shown in FIG. 20, and extending pin 539 to secure assembly 66 in region 530.

A pneumatic motor 550 and pulley assembly 560 combine to engage read/write assembly motor 64, coupled to drum 66 on read/write assembly 60, and rotate motor 64 and drum 66 about rotational axis 63 to allow the system operator or computer vision system to determine rotational axis 63. Motor 550 may comprise a model ZSS 25 provided by Phytron Corporation. Motor 550 is coupled to air cylinders 476 via air conduits so that rotation of head drum 66 to allow determination of the center point to be automated. Pulley assembly 560, including pulleys 562, 564 and rubber O-ring 566 are mounted to mounting block 566. Mounting block 566 is secured on a block mount 554, coupled to base 502, which may be moved toward and away from assembly 66 to extend motor pulley assembly 560 and motor 550 by extending and retracting an air cylinder 552. Thus, movement of block 566 moves pulley assembly 560, and specifically pulley 564 into and out of engagement with motor 64 of read/write assembly 60 when assembly 60 is positioned in mounting region 530. Cylinder 552 may comprise a model 0.25-D air cylinder from BIMBA, Inc. secured on base 502. A bushing 570 is provided as a guide for block 556. A crash stop assembly comprises spacer 572 coupled to bushing 574, which engages stop block 576 secured by hex screws 577 and 578 to drive block 556. A fine adjustment screw 579 allows for adjustment of the position of the crash stop assembly.

In operation, the system operator will place a fully assembled read/write assembly 60 into the mounting region 530. On initiation of the start command, computer 560 will energize cylinder 540 to extend pin 539 to clamp the assembly into the mounting region. Once the assembly is securely clamped, motor 550 will drive rotation of head drum 66 to allow the vision system to locate and record the point indicating rotational axis 63, and to locate the respective position of heads $100_1$–$100_8$. It should be readily recognized that the particular order in which the heads are filleted is of no consequence. Processing in accordance with the aforementioned aspects of the first or second embodiments of the method of the present invention, thereafter proceeds.

It should be further recognized that additional software libraries for actual positioning of the x-y table relative to laser optics 430, and for rotating head drum 66 by powering pneumatic motor 550 are necessary. Such programs are commercially available and are readily within the knowledge of one skilled in the art of programming with knowledge of the specific components utilized in a particular apparatus such as that described herein.

As briefly noted above, the method of the present invention, and specifically apparatus 400, is extremely susceptible to thermal expansion and contraction due to temperature variation. In a further aspect of the present invention, one or more thermoelectric coolers may be secured to fixture 500 to ensure a stable temperature operating range for the fixture. In the absence of such coolers, the thermal ambient environment must be maintained within a range of 1° F. to ensure accurate filleting of heads 100.

The main features and advantages of the present invention will be apparent to those of average skill in the art. It should be appreciated by those skilled in the art that any simple type of computer memory and central processing unit may be utilized with the present invention. Attached hereto is a source code appendix which defines the application method set forth in this respect in the instant specification in the language C. It will be readily appreciated that this particular embodiment may be reprogrammed in any number of suitable languages for use with different types of compilers. All equivalents to the instant invention are intended to be within the scope of the invention as defined by the instant specification, the drawings, and the following claims.

APPENDIX A

```
/*****************************************************************************/
/* Name: fillet_polar                                                        */
/*****************************************************************************/
void fillet_polar(double radius, double rot_angle, double width, double swp_angle, double overlap, double vel, double acl)
{
    double x_pos_current, y_pos_current;              /*Declare Variables.                             */
    double overlap_dis, down_dis, rows_flt;           /*Define the rotated points about current position. */
    double p1_x, p1_y, p2_x, p2_y;                    /*Define the edges of the fillet.                */
    double p1_x_next, p1_y_next, p2_x_next, p2_y_next, hyp;  /*Define the next points in the list.     */
    double x_cntr_next, y_cntr_next;                  /*Define the incremental center.                 */
    double x_end, y_end;                              /*Define the end point of the radius.            */
    int rows, rr;                                     /*Declare the laser power on flag                */
    if(radius<0.0||rot_angle<0.0||rot_angle>360.0||width<0.0||swp_angle<0.0||swp_angle>180.0)
    {
        return;                                       /*Return if input parameters are invalid;        */
    }
    sys_pos(&x_pos_current, &y_pos_current);          /*Get the system position.                       */
    overlap_dis = LASER_WIDTH_IN*(100.0-overlap)*0.01;  /*Calculate the overlap width of the laser.    */
    hyp = width/(2*sin((3.14159/180.0)*(swp_angle/2)));  /*Calculate the hypotonus of the cut width.   */
    radius = radius-hyp;                              /*Adjust the radius                              */
    rows = radius/overlap_dis;                        /*Calculate the number of rows to form a line.   */
    rows_flt = radius/overlap_dis;                    /*Calculate the number of rows to form a line.   */
    if (rows_flt-rows>=0.5)                           /*Check for rounding.                            */
    {
        rows = rows+1;                                /*Rounding up.                                   */
    }
    p1_x = x_pos_current+hyp*cos((3.14159/180.0)*(swp_angle/2.0+rot_angle));
    p1_y = y_pos_current+hyp*sin((3.14159/180.0)*(swp_angle/2.0+rot_angle));
    p2_x = x_pos_current+hyp*cos((3.14159/180.0)*(rot_angle-swp_angle/2.0));
    p2_y = y_pos_current+hyp*sin((3.14159/180.0)*(rot_angle-swp_angle/2.0));
    x_end = x_pos_current+radius*cos((3.14159/180.0)*rot_angle);
    y_end = y_pos_current+radius*sin((3.14159/180.0)*rot_angle);
    update_position_wn("Cutting fillet.        ");   /*Update the position window.                    */
    move_laser_off(p1_x, p1_y, "", vel, acl);         /*Turn off the laser on first move.              */
    for (rr=1; rr<=rows; rr++)                        /*Begin the raster row process.                  */
    {
        if (rr%2>0&&rr==1)                            /*First Row                                      */
        {
            x_cntr_next = x_pos_current+overlap_dis*(rr-1)*cos((3.14159/180.0)*rot_angle);
            y_cntr_next = y_pos_current+overlap_dis*(rr-1)*sin((3.14159/180.0)*rot_angle);
            p2_x_next = p2_x+overlap_dis*rr*cos((3.14159/180.0)*rot_angle);  /*Calculate the next point. */
            p2_y_next = p2_y+overlap_dis*rr*sin((3.14159/180.0)*rot_angle);  /*Calculate the next point. */
            map_axes(2, ax);                          /*Subsequent moves are two axes.                 */
            set_move_speed(vel);                      /*Set the interpolation velocity.                */
            set_move_accel(acl);                      /*Set the interpolation acceleration.            */
            start_point_list();                       /*Start the interpolated move.                   */
            arc_2(x_cntr_next, y_cntr_next, swp_angle);  /*Call MEI two point arc.                     */
            start_motion();                           /*Start Motion of the MEI.                       */
            move_2(p2_x_next, p2_y_next);             /*Move to the next point.                        */
            update_position_wn("Cutting fillet.        ");  /*Update the position window.              */
        }
        if (rr%2==0&&rr<rows)                         /*Even Row and Not Last Row                      */
        {
            x_cntr_next = x_pos_current+overlap_dis*(rr-1)*cos((3.14159/180.0)*rot_angle);
```

```
y_cntr_next = y_pos_current+overlap_dis*(rr-1)*sin((3.14159/180.0)*rot_angle);
p1_x_next = p1_x+overlap_dis*rr*cos((3.14159/180.0)*rot_angle);   /*Calculate the next point.      */
p1_y_next = p1_y+overlap_dis*rr*sin((3.14159/180.0)*rot_angle);   /*Calculate the next point.      */
arc_2(x_cntr_next, y_cntr_next, -swp_angle);           /*Call MEI two point arc.           */
move_2(p1_x_next, p1_y_next);                          /*Move to the next point.           */
update_position_wn("Cutting fillet.        ");         /*Update the position window.       */
}
if (rr%2>0&&rr<rows&&rr!=1)                            /*Odd Row and Not Last Row          */
{
x_cntr_next = x_pos_current+overlap_dis*(rr-1)*cos((3.14159/180.0)*rot_angle);
y_cntr_next = y_pos_current+overlap_dis*(rr-1)*sin((3.14159/180.0)*rot_angle);
p2_x_next = p2_x+overlap_dis*rr*cos((3.14159/180.0)*rot_angle);   /*Calculate the next point.      */
p2_y_next = p2_y+overlap_dis*rr*sin((3.14159/180.0)*rot_angle);   /*Calculate the next point.      */
arc_2(x_cntr_next, y_cntr_next, swp_angle);            /*Call MEI two point arc.           */
move_2(p2_x_next, p2_y_next);                          /*Move to the next point.           */
update_position_wn("Cutting fillet.        ");         /*Update the position window.       */
}
if (rr%2==0&&rr==rows)                                 /*Even Row and Last Row             */
{
x_cntr_next = x_pos_current+overlap_dis*(rr-1)*cos((3.14159/180.0)*rot_angle);
y_cntr_next = y_pos_current+overlap_dis*(rr-1)*sin((3.14159/180.0)*rot_angle);
arc_2(x_cntr_next, y_cntr_next, -swp_angle);           /*Call MEI two point arc.           */
end_point_list();                                      /*End the continuous motion.        */
while (all_done()==FALSE)                              /*Wait for the axis to stop running.*/
    {
    update_position_wn("Cutting fillet.        ");     /*Update the position window.       */
    }
}
if (rr%2>0&&rr==rows)                                  /*Odd Row and Last Row              */
{
x_cntr_next = x_pos_current+overlap_dis*(rr-1)*cos((3.14159/180.0)*rot_angle);
y_cntr_next = y_pos_current+overlap_dis*(rr-1)*sin((3.14159/180.0)*rot_angle);
arc_2(x_cntr_next, y_cntr_next, swp_angle);            /*Call MEI two point arc.           */
end_point_list();                                      /*End the continuous motion.        */
while (all_done()==FALSE)                              /*Wait for the axis to stop running.*/
    {
    update_position_wn("Cutting fillet.        ");     /*Update the position window.       */
    }
}
}
move_laser_off(x_end, y_end, "", vel, acl);            /*Turn off the laser on first move. */
update_position_wn("Idle           ");                 /*Update the position window.       */
return;
}
/*************************************************************************************/
/* Name: core_trim                                                    */
/*************************************************************************************/
void core_trim(double core_width, double track_width, double azimuth, double trim_width, double swp_angle, double overlap, float lsr_pwr, double vel, double acl, int passes)
{
int i;
double swp_hyp;                                        /*Declare variables.                */
double x_pos_current, y_pos_current;                   /*Declare Variables.                */
double start_point_x1, start_point_y1, start_point_x2, start_point_y2;  /*Declare variables. */
double end_point_x1, end_point_y1, end_point_x2, end_point_y2;   /*Declare variables.       */
double radius1, radius2, angle1, angle2;               /*Declare variables.                */
double abs_azimuth;
```

```
if(core_width<0.0||track_width<0.0||track_width>core_width)     /*Test the widths.                          */
{
return;                                             /*Return if invalid width.              */
}
if(azimuth<=-90.0||azimuth>=90.0||swp_angle<0.0||swp_angle>180.0)/*Test the angles.                          */
{
return;                                             /*Return if invalid angles.             */
}
if(overlap<0.0||overlap>=100.0)                     /*Test the overlap percentage.          */
{
return;                                             /*Return if invalid percentage.         */
}
if (azimuth<0.0)                                    /*Take the absolute value, fabs did not work.  */
{
abs_azimuth = azimuth*-1.0;                         /*Change the sign if negative.          */
}
else
{
abs_azimuth = azimuth*1.0;                          /*Do not change the sign if negative.   */
}
swp_hyp = trim_width/(2*sin((3.14159/180.0)*(swp_angle/2)));    /*Calculate the hypotonus of the cut width.  */
sys_pos(&x_pos_current,&y_pos_current);             /*Get current position.                 */
if (azimuth>=0.0&&swp_angle/2>=abs_azimuth)         /*Check the azimuth angle to see if greater than 0. */
{
start_point_x1 = x_pos_current-(0.5*(core_width-track_width)+swp_hyp)*tan((3.14159/180.0)*abs_azimuth);
start_point_y1 = y_pos_current-(0.5*(core_width-track_width)+swp_hyp);
start_point_x2 = x_pos_current+(0.5*(core_width+track_width)+swp_hyp)*tan((3.14159/180.0)*abs_azimuth);
start_point_y2 = y_pos_current+(0.5*(core_width+track_width)+swp_hyp);
end_point_x1 = x_pos_current;
end_point_y1 = y_pos_current;
end_point_x2 = x_pos_current+track_width*tan((3.14159/180.0)*abs_azimuth);
end_point_y2 = y_pos_current+track_width;
radius1=sqrt((end_point_x1-start_point_x1)*(end_point_x1-start_point_x1)+(end_point_y1-start_point_y1)*(end_point_y1-
        start_point_y1));
radius2=sqrt((end_point_x2-start_point_x2)*(end_point_x2-start_point_x2)+(end_point_y2-start_point_y2)*
        (end_point_y2-start_point_y2));
angle1 = 90.0-azimuth;                              /*Calculate the start angle two.        */
angle2 = 270.0-azimuth;                             /*Calculate the start angle one.        */
}
if (azimuth>=0.0&&swp_angle/2<abs_azimuth)          /*Check the azimuth angle to see if greater than 0. */
{
start_point_x1=x_pos_current-(0.5*(core_width-track_width)+swp_hyp*cos((3.14159/180.0)*(abs_azimuth-0.5*swp_angle)))
        *tan((3.14159/180.0)*abs_azimuth);
start_point_y1 = y_pos_current-(0.5*(core_width-track_width)+swp_hyp*cos((3.14159/180.0)*
        (abs_azimuth-0.5*swp_angle)));
start_point_x2 = x_pos_current+(0.5*(core_width+track_width)+swp_hyp*cos((3.14159/180.0)
        *(abs_azimuth-0.5*swp_angle)))*tan((3.14159/180.0)*abs_azimuth);
start_point_y2 = y_pos_current+(0.5*(core_width+track_width)+swp_hyp*cos((3.14159/180.0)
        *(abs_azimuth-0.5*swp_angle)));
end_point_x1 = x_pos_current;
end_point_y1 = y_pos_current;
end_point_x2 = x_pos_current+track_width*tan((3.14159/180.0)*abs_azimuth);
end_point_y2 = y_pos_current+track_width;
radius1 = sqrt((end_point_x1-start_point_x1)*(end_point_x1-start_point_x1)
        +(end_point_y1-start_point_y1)*(end_point_y1-start_point_y1));
radius2 = sqrt((end_point_x2-start_point_x2)*(end_point_x2-start_point_x2)
        +(end_point_y2-start_point_y2)*(end_point_y2-start_point_y2));
```

```
        angle1 = 90.0-azimuth;                                  /*Calculate the start angle two.              */
        angle2 = 270.0-azimuth;                                 /*Calculate the start angle one.              */
      }
      if (azimuth<0.0&&swp_angle/2>=abs_azimuth)                /*Check the azimuth angle to see if greater than 0. */
 5    {
        start_point_x1 = x_pos_current+(0.5*(core_width-track_width)+swp_hyp)*tan((3.14159/180.0)*abs_azimuth);
        start_point_y1 = y_pos_current-(0.5*(core_width-track_width)+swp_hyp);
        start_point_x2 = x_pos_current-(0.5*(core_width+track_width)+swp_hyp)*tan((3.14159/180.0)*abs_azimuth);
        start_point_y2 = y_pos_current+(0.5*(core_width+track_width)+swp_hyp);
10      end_point_x1 = x_pos_current;
        end_point_y1 = y_pos_current;
        end_point_x2 = x_pos_current-track_width*tan((3.14159/180.0)*abs_azimuth);
        end_point_y2 = y_pos_current+track_width;
        radius1 = sqrt((end_point_x1-start_point_x1)*(end_point_x1-start_point_x1)
15              +(end_point_y1-start_point_y1)*(end_point_y1-start_point_y1));
        radius2 = sqrt((end_point_x2-start_point_x2)*(end_point_x2-start_point_x2)
                +(end_point_y2-start_point_y2)*(end_point_y2-start_point_y2));
        angle1 = 90.0-azimuth;                                  /*Calculate the start angle two.              */
        angle2 = 270.0-azimuth;                                 /*Calculate the start angle one.              */
20    }
      if (azimuth<0.0&&swp_angle/2<abs_azimuth)                 /*Check the azimuth angle to see if greater than 0. */
      {
        start_point_x1 = x_pos_current+(0.5*(core_width-track_width)+swp_hyp
                *cos((3.14159/180.0)*(abs_azimuth-0.5*swp_angle)))*tan((3.14159/180.0)*abs_azimuth);
25      start_point_y1 = y_pos_current-(0.5*(core_width-track_width)
                +swp_hyp*cos((3.14159/180.0)*(abs_azimuth-0.5*swp_angle)));
        start_point_x2 = x_pos_current-(0.5*(core_width+track_width)+swp_hyp
                *cos((3.14159/180.07)*(abs_azimuth-0.5*swp_angle)))*tan((3.14159/180.0)*abs_azimuth);
        start_point_y2 = y_pos_current+(0.5*(core_width+track_width)+swp_hyp
30              *cos((3.14159/180.0)*(abs_azimuth-0.5*swp_angle)));
        end_point_x1 = x_pos_current;
        end_point_y1 = y_pos_current;
        end_point_x2 = x_pos_current-track_width*tan((3.14159/180.0)*abs_azimuth);
        end_point_y2 = y_pos_current+track_width;
35      radius1 = sqrt((end_point_x1-start_point_x1)*(end_point_x1-start_point_x1)
                +(end_point_y1-start_point_y1)*(end_point_y1-start_point_y1));
        radius2 = sqrt((end_point_x2-start_point_x2)*(end_point_x2-start_point_x2)
                +(end_point_y2-start_point_y2)*(end_point_y2-start_point_y2));
        angle1 = 90.0-azimuth;                                  /*Calculate the start angle two.              */
40      angle2 = 270.0-azimuth;                                 /*Calculate the start angle one.              */
      }
      update_position_wn("Cutting core.      ");                /*Update the position window.                 */
      delay(1250);
      for (i=1; i<=passes; i++)
45    {
        clear_status(X_AXIS);                                   /*Clear the axis when the system is done moving. */
        clear_status(Y_AXIS);                                   /*Clear the axis when the system is done moving. */
        laser_pwr(PWR_OFF, lsr_pwr);
        pa_script(start_point_x1, start_point_y1, vel, acl);    /*Move to the start position of the trim.     */
50      laser_pwr(PWR_ON, lsr_pwr);
        fillet_polar(radius1, angle1, trim_width, swp_angle, overlap, vel, acl);
        laser_pwr(PWR_OFF, lsr_pwr);
        pa_script(start_point_x2, start_point_y2, vel, acl);
        laser_pwr(PWR_ON, lsr_pwr);
55      fillet_polar(radius2, angle2, trim_width, swp_angle, overlap, vel, acl);
        laser_pwr(PWR_OFF, lsr_pwr);
        pa_script(x_pos_current, y_pos_current, vel, acl);
```

```
        }
        delay(750);
        update_position_wn("Finished cutting core.    ");      /*Update the position window.        */
        delay(1250);
5       update_position_wn("Idle                     ");      /*Update the position window.        */
        return;
        }
```

What is claimed is:

1. A method of manufacturing an arcuate scan drive, the drive including a plurality of read/write heads, each head comprised of core material, having a gap and being mounted to a rotating drum, the rotating drum including a rotational center point positioned on an axis about which said drum rotates, comprising:

rotating the drum to determine the rotational center point of the drum;

specifying a gap width for each gap;

specifying a distance from the rotational center point to the head gap; and laser machining each of the head gaps to define said gap width for each head such that each head gap width is positioned at said distance from the rotational center point of the rotating drum.

2. The method of claim 1 wherein the arcuate scan drive includes a data storage medium and the rotating drum rotates adjacent to the data storage medium to record and retrieve data stored on data tracks having a track width, wherein the gap width is specified to be equal to the track width.

3. The method of claim 2 wherein said step of laser machining comprises marking a first point on the gap at the distance from the rotational axis;

etching a first side of the head from the first side to the mark point; and etching a second side of the head from the second side to a position defined opposite the first point plus the track width.

4. The method of claim 3 wherein each said etching step comprises moving the laser along an first arcuate path at a positive angle with respect to a point of origin on a line passing through the gap;

incrementing the beam by a distance in a direction desired for the cut; and moving the laser along a second arcuate path equivalent to the first arcuate path at an inverse of the angle with respect to a second point of origin on a line passing through the center of the gap, the second point of origin being incremented by an amount equivalent to the distance which the beam is incremented.

5. The method of claim 1 wherein said step of laser machining comprises:

alternately (1) cutting the core material with a laser to provide the recording gap, the gap having a length and said width, by moving the laser beam in a direction perpendicular to the length of the gap where the beam crosses the gap, and (2) incrementing the beam in a direction parallel to the width to reduce the width of the gap.

6. The method of claim 5 wherein the recording gap includes a first side and a second side, and said step (1) comprises etching on the first and the second sides of the gap with a laser to define the width of the gap.

7. The method of claim 6 wherein said step of etching comprises:

making a first plurality of cuts on the first side of the gap to remove one-half of an amount of core material to define the width of the recording gap; and making a second plurality of cuts on the second side of the gap to remove a second half of the amount of core material required to define the width of the recording gap, thereby leaving the gap at the defined width.

8. The method of claim 7 wherein said step of cutting the core material further comprises moving the laser beam in an arcuate manner from a first point to a second point about an angle relative to a point of origin on a line bisecting the length of the gap.

9. The method of claim 8 further including the steps of defining, prior to cutting the core material, a start point and end point on the line, the start point representing the first point of origin on the line, the end point defining the limit of the cut along the width of the gap.

10. The method of claim 9 wherein the start point and end point are defined relative to a position on the gap at a point representing the center of the gap.

11. The method of claim 9 wherein the end point is defined relative to a position unrelated to the gap.

12. A method for defining the characteristics of a magnetic recording head, the head including a first pole and a second pole formed of magnetically permeable material, the first pole and the second pole being separated by a gap, the gap having a length, a width defined by a first and second sides of the head, and a center between the first and second sides, said head being mounted on a rotatable drum, the method comprising:

(a) rotating the drum to determine a rotational center point for the drum;

(b) specifying a gap width for each gap;

(c) specifying a distance from the rotational center point to the head gap; and (d) laser machining each of the head gaps to said gap width such that each head gap is positioned at said distance from the rotational center point of the head, said laser machining comprising the sub-steps of:

(i) placing a cutting instrument at a first position adjacent to the gap;

(ii) making a first plurality of successive arcuate cuts to reduce the width of the gap;

(iii) placing the cutting instrument at a second position adjacent to the gap; and (iv) making a second plurality of successive arcuate cuts to reduce the width of the gap.

13. The method of claim 12 wherein each of said plurality of arcuate cuts has an arc length greater than the length of the gap, such that the arcuate cut is a direction which is perpendicular to the width of the gap when the arcuate cut intersects the gap.

14. The method of claim 13 wherein the first and second positions represent a first side and a second side of the gap.

15. The method of claim 14 wherein said steps (ii) and (iv) comprise (1) defining a first point of origin on a line bisecting the length of the gap;

(2) defining an angle;

(3) calculating the hypotenuse of one half of the angle relative to line and one side of the recording head;

(4) moving the laser along the arc defined rotation of the hypotenuse of the angle about the point of origin at the angle; and (5) incrementing the point of origin in a direction toward the center of the gap.

16. The method of claim 15 further including the steps of (6) calculating a start point and an end point, the start point representing the first point of origin on the line, the end point representing the limit of the arcuate cuts along the line; and (7) repeating steps (4) and (5) until the end point lies along the arc of the laser.

17. A method for filleting the magnetic recording head gaps of a plurality of heads, each head being manufactured from a piece of ferrite material having a gap, each of said plurality of heads being mounted to a rotatable drum, to record and retrieve data from a storage medium having data tracks, each data track having a track width, the method comprising:

(a) rotating the drum to determine a rotational center point for the rotatable drum;

(b) selecting a gap width for each head;

(c) specifying a distance from the rotational center point to the gap and marking a first point on the gap of each head;

(d) etching a first side of one of the plurality of heads from the first side to the mark point;

(e) etching a second side of one of the plurality of heads from the second side to a position defined as the mark point plus the track width; and (f) repeating steps (d) and (e) for each of said plurality of heads.

* * * * *